(12) United States Patent
Drugeon et al.

(10) Patent No.: US 9,215,465 B2
(45) Date of Patent: *Dec. 15, 2015

(54) SPATIAL PREDICTION METHOD, IMAGE DECODING METHOD, AND IMAGE CODING METHOD

(71) Applicant: Panasonic Intellectual Property Corporation of America, Torrance, CA (US)

(72) Inventors: Virginie Drugeon, Darmstadt (DE); Youji Shibahara, Osaka (JP); Takahiro Nishi, Nara (JP); Hisao Sasai, Osaka (JP); Kyoko Tanikawa, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/446,459

(22) Filed: Jul. 30, 2014

(65) Prior Publication Data

US 2014/0334544 A1 Nov. 13, 2014

Related U.S. Application Data

(63) Continuation of application No. 13/639,116, filed as application No. PCT/JP2011/002113 on Apr. 11, 2011, now Pat. No. 8,824,817.

(30) Foreign Application Priority Data

Apr. 12, 2010 (EP) .................................... 10003876

(51) Int. Cl.
*G06K 9/36* (2006.01)
*H04N 19/136* (2014.01)
(Continued)

(52) U.S. Cl.
CPC ............. *H04N 19/136* (2014.11); *H04N 19/11* (2014.11); *H04N 19/14* (2014.11); *H04N 19/176* (2014.11); *H04N 19/44* (2014.11); *H04N 19/593* (2014.11)

(58) Field of Classification Search
USPC ........... 382/238, 232, 233; 307/150; 320/107; 369/44.34, 124.07; 702/63
See application file for complete search history.

(56) References Cited

U.S. PATENT DOCUMENTS 6,940,557 B2 9/2005 Handjojo et al. ............. 348/452
7,054,494 B2 5/2006 Lin et al. ...................... 382/233

(Continued)

FOREIGN PATENT DOCUMENTS

EP 2 081 386 7/2009 ............... H04N 7/34
EP 2 166 769 3/2010 ............... H04N 7/32

(Continued)

OTHER PUBLICATIONS

Office Action issued Feb. 4, 2015 in European Application No. 11 768 609.7.

(Continued)

*Primary Examiner* — Anh Do
(74) *Attorney, Agent, or Firm* — Wenderoth, Lind & Ponack, L.L.P.

(57) ABSTRACT

A spatial prediction method capable of reducing the complexity of spatial prediction includes: detecting an edge (E) overlapping the current block by obtaining a horizontal gradient (Gy) and a vertical gradient (Gx) between pixels within a block adjacent to the current block; calculating an integer slope of the edge; determining, for each pixel position within the current block, a sub-pel position being an intersection between (i) a line that has the integer slope and passes through the pixel position and (ii) a boundary of the adjacent block; and predicting, for each pixel position, a pixel value at the pixel position based on a pixel value interpolated in the sub-pel position, wherein the boundary of the adjacent block is a row or a column that is the closest to the current block, among rows or columns of pixels included in the adjacent block.

3 Claims, 26 Drawing Sheets

(51) Int. Cl.
*H04N 19/176* (2014.01)
*H04N 19/593* (2014.01)
*H04N 19/11* (2014.01)
*H04N 19/14* (2014.01)
*H04N 19/44* (2014.01)

(56) References Cited

U.S. PATENT DOCUMENTS

| | | |
|---|---|---|
| 7,127,114 B2 | 10/2006 | Lin et al. .................. 382/236 |
| 7,796,480 B2 * | 9/2010 | Cheng et al. ............... 369/44.34 |
| 8,379,985 B2 | 2/2013 | Sodagar .................... 382/195 |
| 8,644,382 B2 | 2/2014 | Tsukuba et al. ......... 375/240.12 |
| 8,824,817 B2 * | 9/2014 | Drugeon et al. ............. 382/238 |
| 2007/0014482 A1 | 1/2007 | Kim et al. .................. 382/256 |
| 2007/0036215 A1 | 2/2007 | Pan et al. ............... 375/240.12 |
| 2007/0133891 A1 | 6/2007 | Jeong ...................... 382/232 |
| 2010/0128995 A1 | 5/2010 | Drugeon et al. ............. 382/238 |
| 2010/0208802 A1 | 8/2010 | Tsukuba et al. ......... 375/240.12 |
| 2011/0194603 A1 | 8/2011 | Laimema et al. ........ 375/240.12 |
| 2012/0020580 A1 | 1/2012 | Sasai et al. ................ 382/232 |
| 2014/0105288 A1 | 4/2014 | Tsukuba et al. ......... 375/240.12 |

FOREIGN PATENT DOCUMENTS

| | | | |
|---|---|---|---|
| JP | 2006-523073 | 10/2006 | .............. H03M 7/36 |
| JP | 2009-284275 | 12/2009 | ................ H04N 7/32 |
| WO | 2009/090884 | 7/2009 | ....... H04N 19/00733 |
| WO | 2010/087157 | 8/2010 | ........... H04N 19/176 |

OTHER PUBLICATIONS

Rui Su et al., "Fast Mode Decision Algorithm for Intra Prediction in H.264/AVC", Acoustics, Speech and Signal processing, 2006 IEEE International Conference on (ICASSP 2006), Toulouse, France, May 14-19, 2006, XP031386531.

International Search Report issued Jul. 12, 2011 in International (PCT) Application No. PCT/JP2011/002113.

European Search Report of European Application No. 10003876.9 issued on Oct. 1, 2010.

Virginie Drugeon et al., "High Precision Edge Prediction for Intra Coding", Image Processing, 2008. ICIP 2008. 15th IEEE International Conference on, Oct. 12-15, 2008, p. 1620-1623, ISBN: 978-1-4244-1765-0.

Stuart F. Oberman et al., "Division Algorithms and Implementations", IEEE Transactions on Computers, DOI : 10.1109/12.609274, vol. 46, No. 8, Aug. 1997, pp. 833-854, ISSN: 0018-9340.

Wen-Ping Lee et al., "A Joint Architecture of Error-Concealed Deblocking Filter for H.264/AVC Video Transmission", VLSI Design, Automation and Test, 2007, VLSI-DAT 2007, International Symposium on, IEEE, Apr. 2007, p. 1-4.

Takeshi Tsukuba et al., "Adaptive Multidirectional Intra Prediction", ITU—Telecommunications Standardization Sector, Study Group 16, Question 6, Video Coding Experts Group (VCEG), VCEG-AG05, 33rd Meeting: Shenzhen, China, Oct. 20, 2007, pp. 1-6.

Kemal Ugur et al., "Description of video coding technology proposal by Tandberg, Nokia, Ericsson", Joint Collaborative Team on Video Coding (JCT-VC) of ITU-T SG16 WP3 and ISO/IEC JTC1/SC29/WG11, JCTVC-A119, 1st Meeting: Dresden, DE, Apr. 15-23, 2010, pp. 1-7.

Office Action and Search Report issued Jul. 9, 2015 in Chinese Application No. 201180018178.3, with partial English translation.

Masaharu Suzuki, "Variety of means for division circuit design—Table approximation and correction for accuracy improvement (No. 5, Final)", Design Wave Magazine, CQ Publishing Co., Ltd., Jan. 2006, vol. II, Issue No. 1, pp. 128-135, with English translation.

\* cited by examiner

FIG. 1 - PRIOR ART

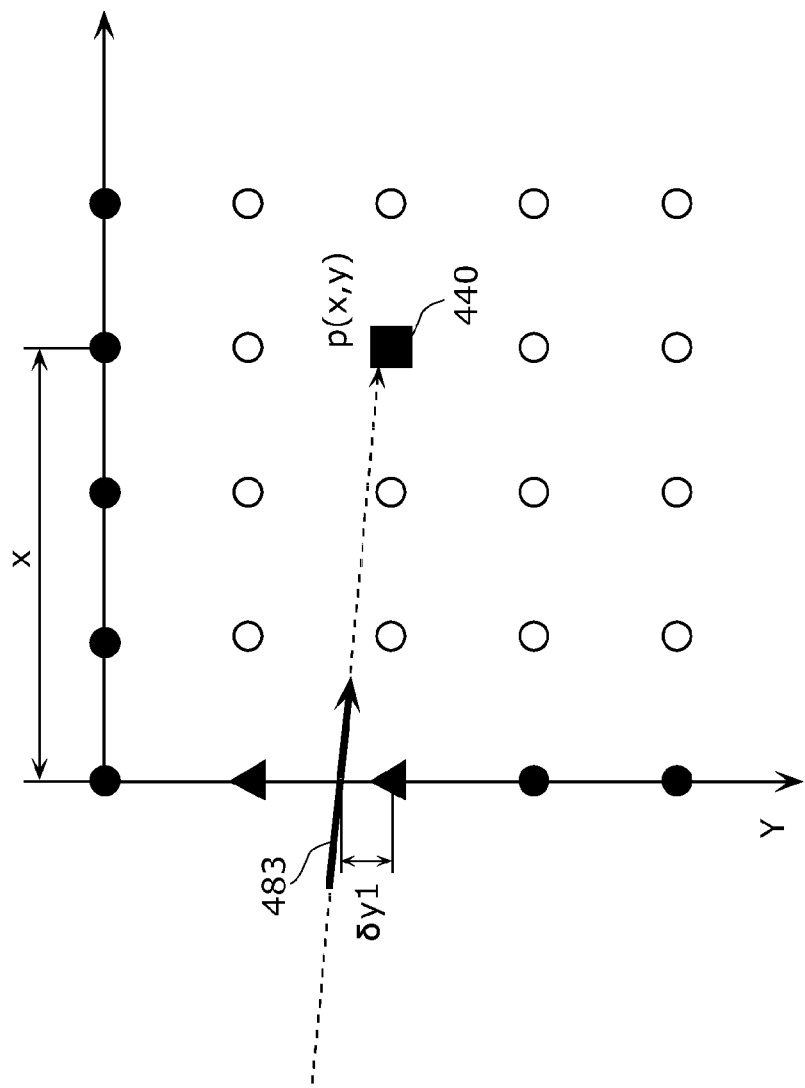

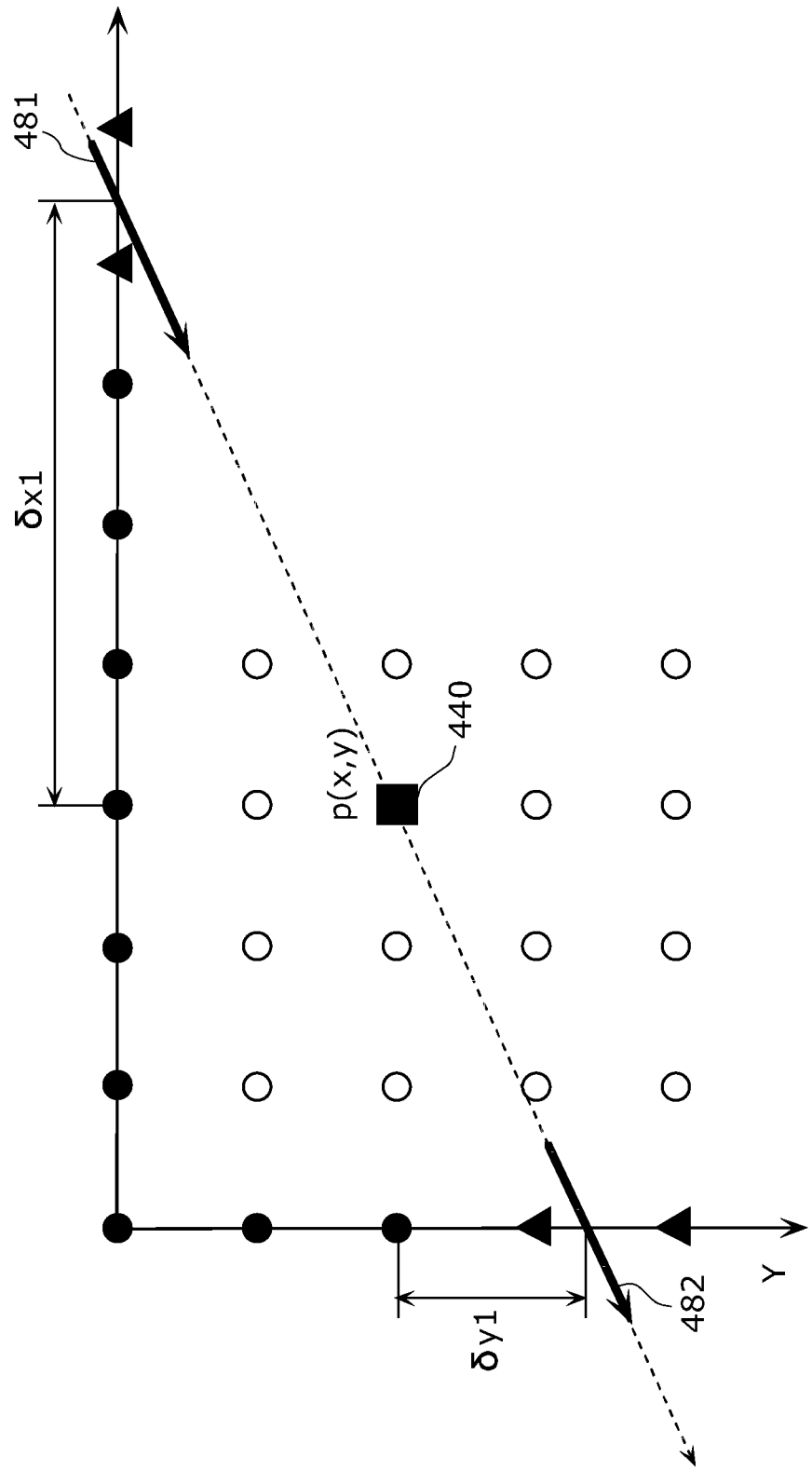

FIG. 14

| Video stream (PID=0x1011, Primary video) |
| Audio stream (PID=0x1100) |
| Audio stream (PID=0x1101) |
| Presentation graphics stream (PID=0x1200) |
| Presentation graphics stream (PID=0x1201) |
| Interactive graphics stream (PID=0x1400) |
| Video stream (PID=0x1B00, Secondary video) |
| Video stream (PID=0x1B01, Secondary video) |

FIG. 17
Stream of TS packets
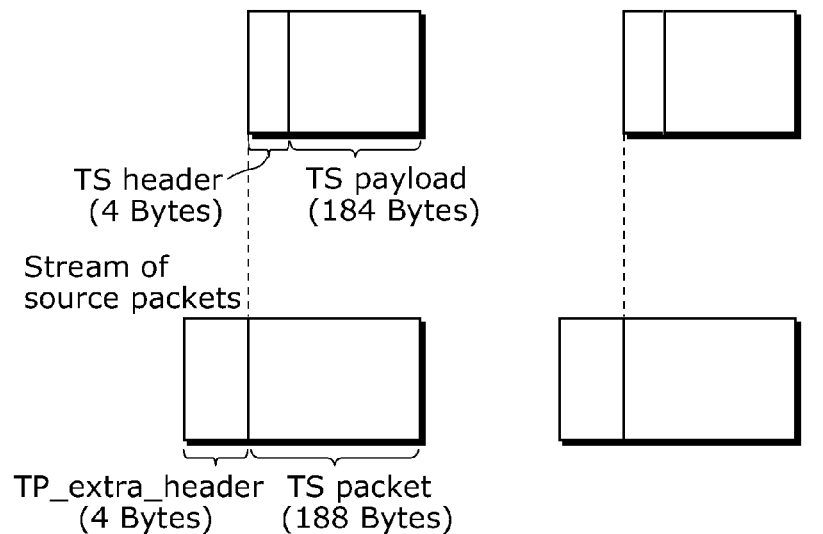
Multiplexed data
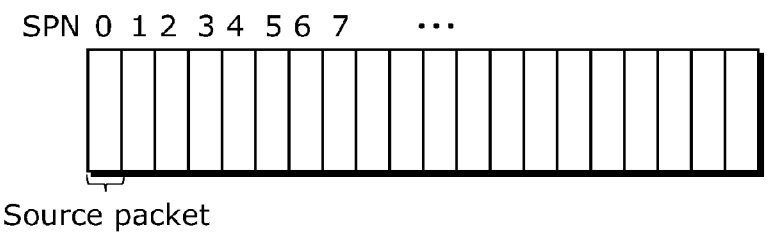
FIG. 18
Data structure of PMT
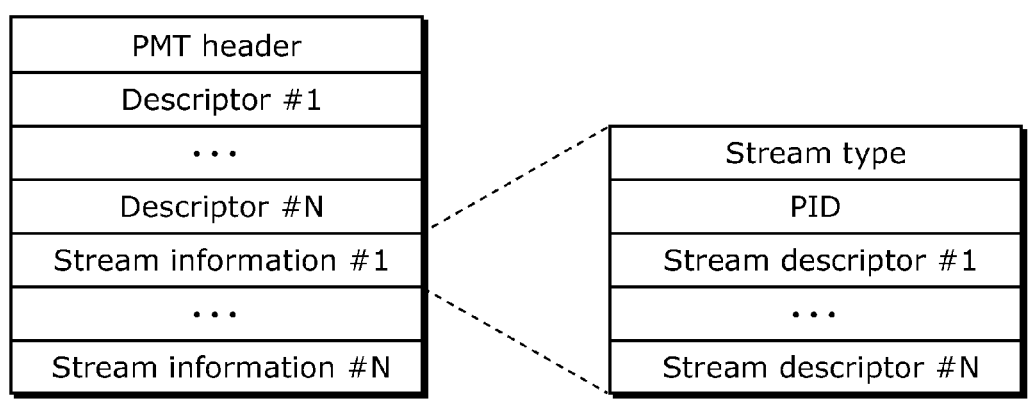

FIG. 25
| Corresponding standard | Driving frequency |
|---|---|
| MPEG-4 AVC | 500 MHz |
| MPEG-2 | 350 MHz |
| ⋮ | ⋮ |
FIG. 26A
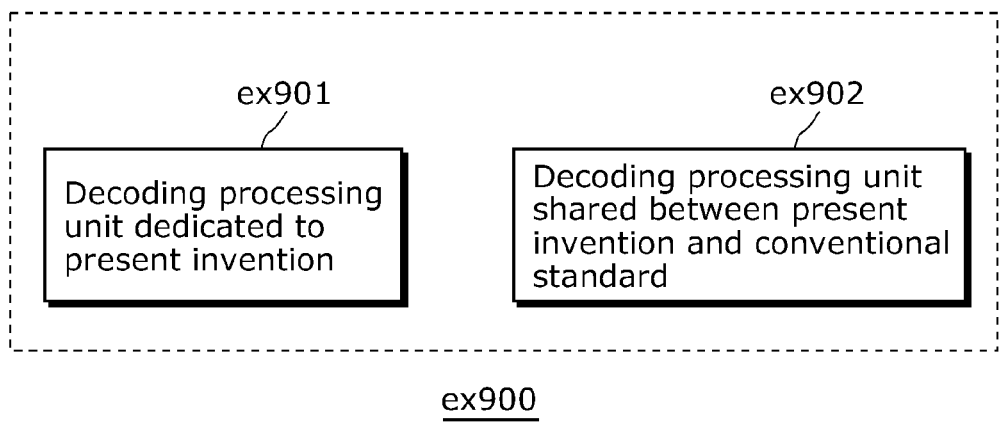
FIG. 26B
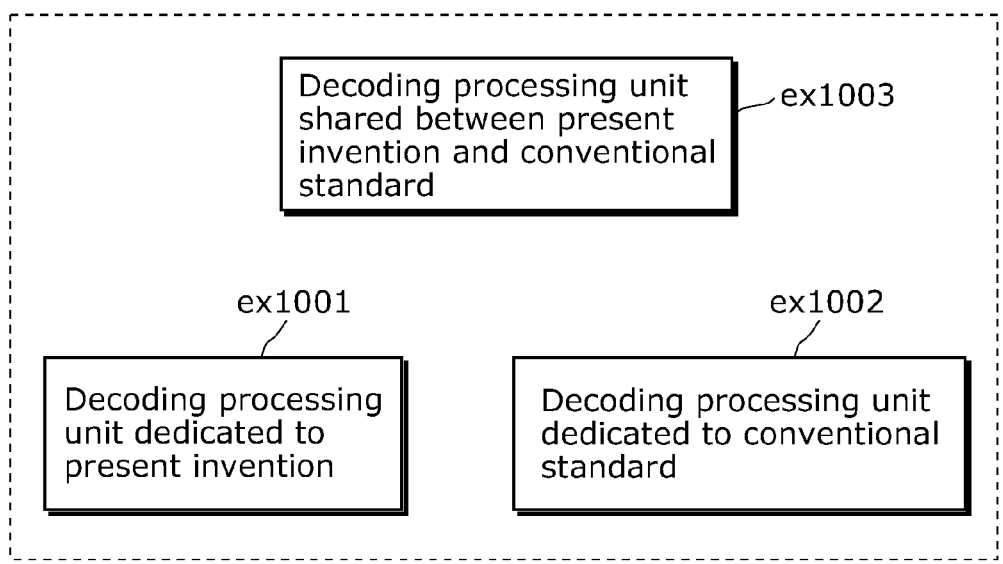

SPATIAL PREDICTION METHOD, IMAGE DECODING METHOD, AND IMAGE CODING METHOD

BACKGROUND OF THE INVENTION

1. Field of the Invention

The present invention relates to a spatial prediction method in coding and decoding an image, and in particular to a directional spatial interpolation involving edge detection or to efficient implementation of such an interpolation.

2. Description of Related Art

Spatial prediction methods, that is, spatial interpolation have been employed in many applications. In particular, spatial interpolation forms an essential part of many image and video coding and processing applications. In hybrid image or video coding algorithms, spatial prediction is typically employed for determining a prediction for an image block based on the pixels of already coded/decoded blocks. On the other hand, spatial interpolation may also be used as a part of post processing the decoded image or video signal, in particular for error concealment.

The majority of standardized video coding algorithms are based on hybrid video coding. Hybrid video coding methods typically combine several different lossless and lossy compression schemes in order to achieve the desired compression gain. Hybrid video coding is also the basis for ITU-T standards (H.26x standards such as H.261 and H.263) as well as ISO/IEC standards (MPEG-X standards such as MPEG-1, MPEG-2, and MPEG-4). The most recent and advanced video coding standard is currently the standard denoted as H.264/MPEG-4 advanced video coding (AVC) which is a result of standardization efforts by joint video team (JVT), a joint team of ITU-T and ISO/IEC MPEG groups.

An image signal (input signal or input video signal) input to an encoder (image coding apparatus) is a sequence of images called frames (video frames), each frame being a two-dimensional matrix of pixels. All the above-mentioned standards based on hybrid video coding include subdividing each individual frame into smaller blocks consisting of a plurality of pixels. Typically, a macroblock (usually denoting a block of 16×16 pixels) is the basic image element, for which the coding is performed. However, various particular coding steps may be performed for smaller image elements, denoted subblocks or simply blocks and having the size of, for instance, 8×8, 4×4, and 16×8.

In the intra coding in accordance with H.264/MPEG-4 AVC, spatial prediction is performed on subblocks or macroblocks of the sizes of 8×8, 4×4, 16×16 in order to reduce spatial redundancy. Spatial prediction is also referred to as spatial interpolation, intra prediction, or intra frame prediction. Spatial prediction using a spatial direction is referred to as directional spatial prediction. Furthermore, coding using such spatial prediction is referred to as intra coding or spatial coding, and an image or a block that is intra-coded is an intra-coded image or an intra-coded block. Intra-fame prediction uses a predefined set of intra-prediction modes (spatial prediction modes including the directional prediction mode), which basically predict the current (prediction target) block using the boundary pixels of the neighboring blocks already coded.

FIG. 1 schematically illustrates the eight directional spatial prediction modes used for the subblocks of 4×4 pixels. The different types (modes) of directional spatial prediction refer to different edge directions, i.e. the direction of the applied two-dimensional extrapolation as illustrated in FIG. 1. There are eight different directional prediction modes and one DC prediction mode for subblocks of the sizes 4×4 and 8×8, and three different directional prediction modes and one DC prediction mode for the macroblocks of 16×16 pixels.

Eight of the directional spatial prediction modes are labeled by a value 302 of range {0, 1, 3, 4, 5, 6, 7, 8} and associated with predictions in eight different directions 301. The remaining one prediction mode (spatial prediction mode) is labeled by a value of 2 and called "DC prediction mode". In the DC prediction mode, all pixels in a block are predicted by a single value, which is the mean value of the surrounding reference pixels. In the eight directional spatial prediction modes, the current block is predicted so that the reference pixels are repeated along the corresponding directions 301. For instance, the vertical mode that is a directional spatial prediction mode labeled with "0" vertically repeats the reference pixels of the row immediately above the current block. The horizontal mode that is a directional spatial prediction mode labeled with "1" horizontally repeats the reference pixels of the column immediately to the left of the current block. The remaining directional spatial prediction modes labeled with values from 3 to 8 are diagonal intra prediction modes, according to which the reference pixels are diagonally repeated in the respective diagonal directions.

In video coding, intra-coded blocks serve for refreshing the video sequence and stopping the error propagation. However, the efficiency of the spatial coding is lower than the performance of the temporal coding (inter coding), which leads to a lower overall compression gain as well as to high variations of the resulting bit rate.

In order to increase the coding efficiency, an improved spatial prediction in which the number of extrapolation directions for predicting pixels of a block is not limited to eight is suggested (see PTL 1). Rather, edge detection is performed within the already decoded neighboring blocks in PTL 1. Based on detection of the edge determined as dominant, the pixels of the block are extrapolated or interpolated possibly from a sub-pel position between pixels belonging to a neighboring block.

PTL 1 enables a more precise determination of a prediction direction. This leads to a more precise spatial prediction, which, on the other hand, results in smaller prediction error signal (difference between the current block and a predicted block) and thus, to a better compression.

PTL1: European Patent Application Publication No. 2081386

BRIEF SUMMARY OF THE INVENTION

However, the edge detection and the extrapolation or interpolation in the direction of the detected dominant edge require a plurality of rather complex calculations such as divisions, which increases the complexity and reduces the easiness of implementation of the coding and/or decoding. In a lot of applications, it is necessary that at least the decoder (image decoding apparatus) has as low complexity as possible. In particular, employment in devices with a limited power supply and/or processing methods requires low-complexity implementations of an encoder and/or a decoder.

The present invention has been conceived to solve the problems, and the aim of the present invention is to provide a spatial prediction method that can reduce complexity of the spatial prediction.

In order to achieve the aim, a spatial prediction method according to an aspect of the present invention is a spatial prediction method for spatially predicting a pixel value at each pixel position within a current block included in an image, and the method includes: detecting an edge that overlaps the current block by obtaining a horizontal gradient and a vertical gradient between pixels within a block adjacent to the current block; calculating an integer slope based on at least one of the horizontal gradient and the vertical gradient, the integer slope indicating an integer value of a slope of the detected edge; determining a sub-pel position for each of the pixel positions within the current block, the sub-pel position being an intersection between (i) a line that has the calculated integer slope and passes through the pixel position and (ii) a boundary of the adjacent block; and predicting, for each of the pixel positions, the pixel value at the pixel position based on a pixel value interpolated in the sub-pel position determined for the pixel position, wherein the boundary of the adjacent block is a row or a column that is closest to the current block, among a plurality of rows or a plurality of columns of pixels included in the adjacent block.

Thereby, the integer slope of the edge that overlaps the current block (edge entering the current block) is first calculated, and the sub-pel position corresponding to each of the pixel positions within the current block is determined according to the integer slope. Here, the sub-pel position for each of the pixel positions within the current block can be determined using the integer slope, without a division. Thus, the division can be prevented for each of the pixel positions within the current block. In other words, it is possible to prevent for each of the pixel positions within the current block (i) multiplication of the coordinate value horizontal or the vertical to the pixel position, by one of the horizontal component and the vertical component of the edge, and (ii) division of the result of the multiplication by the other of the horizontal component and the vertical component. As a result, even when calculation of the integer slope of the edge requires a division only once, the division for each of the pixel positions within the current block can be prevented, and the complexity of the spatial prediction can be reduced. In other words, complex operations can be suppressed.

In other words, the spatial prediction method according to an aspect of the present invention is characterized by calculating an integer slope of the detected edge solely for the current block based on at least one of a vertical gradient and a horizontal gradient, and determining an intersection of the line of the integer slope and a row or a column of the boundary pixels in the neighboring blocks.

Furthermore, in the calculating, the one of the horizontal gradient and the vertical gradient may be scaled by a c-th power of 2, and the integer slope may be calculated using the scaled one of the horizontal gradient and the vertical gradient, c being a positive integer, and in the determining, the sub-pel position for the pixel position may be calculated by multiplying the integer slope generated by the scaling by a coordinate value horizontal or vertical to the pixel position to be predicted within the current block.

Since the integer slope is calculated by scaling one of the vertical gradient and the horizontal gradient by a c-th power of 2, the precision of the integer slope can be increased by the scaling when the integer slope is calculated by a division in which a value indicating a gradient to be scaled is used as the number to be divided (numerator). Furthermore, since scaling by a c-th power of 2 is performed, the scaling can be easily performed by shifting bits of the value to the left. Furthermore, the sub-pel position calculated by this scaling can be easily rescaled by shifting bits of the value to the right. Furthermore, since the precision of the integer slope is higher, the precision of the sub-pel position can be increased.

The spatial prediction method may further include calculating the value of c using a function of the one of the horizontal gradient and the vertical gradient.

Accordingly, the scaling using an appropriate c can be implemented. For example, the integer slope is calculated by a division in which the value indicating the gradient to be scaled is used as the number to be divided (numerator). When the value is larger, overflow of the integer slope can be prevented by setting c to be applied to the gradient smaller.

Furthermore, in the calculating, a result of a division may be obtained with reference to a division table stored in a memory, and the integer slope may be calculated using the obtained result of the division, the division using, as a divisor, a value indicating the one of the horizontal gradient and the vertical gradient, and the division table indicating, for each predetermined value, the predetermined value and a result of a division using the predetermined value as a divisor.

Accordingly, since the division table indicating a result of the division in which a predetermined value is used as a divisor (denominator) for each of the values is referred to, the result can be easily obtained without actually performing a division in which a value indicating one of the horizontal gradient and the vertical gradient is used as a divisor (denominator). The integer slope can be calculated using the result of the division with ease, that is, with low complexity.

Here, the memory may be either an internal memory or an external memory of an apparatus that predicts a pixel value (intra prediction unit). Furthermore, in the result of the division indicated in the division table, the number to be divided (numerator) is advantageously an a-th power of 2, a being a positive integer. Still preferably, the value of a is a function of the horizontal or the vertical gradient, in particular, a function of the gradient applied as a divisor. This enables selecting higher a for a larger divisor and lower a for a lower divisor, resulting in a further increase in the prediction accuracy.

Furthermore, a maximum value of the predetermined value indicated in the division table may be a b-th power of 2, b being an integer, and in the calculating, when the value indicating the one of the horizontal gradient and the vertical gradient used as the divisor exceeds the b-th power of 2, the one of the horizontal gradient and the vertical gradient may be scaled by shifting bits of the value to the right to obtain the result of the division using, as a divisor, a value indicating the scaled one of the horizontal gradient and the vertical gradient.

Accordingly, when a value indicating one of the horizontal gradient and the vertical gradient as a divisor exceeds a b-th power of 2, that is, the maximum predetermined value indicated in the division table, the bits of the value indicating the gradient are shifted to the right, and the result of the division using the value whose bits have been shifted as a divisor is obtained from the division table. Thus, even with limitation in the division table, the result of the division can be easily obtained over the limit.

Furthermore, in the calculating, the integer slope may be calculated by dividing a value indicating one of the horizontal gradient and the vertical gradient by a value indicating the other of the horizontal gradient and the vertical gradient, when the pixel value at each of the pixel positions within the current block is predicted, weights may be set according to a distance, in the boundary, between the sub-pel position determined for the pixel position and each of full-pel positions adjacent to the sub-pel position, and the pixel value at the sub-pel position may be interpolated by setting a corresponding one of the weights to each pixel value of the full-pel positions and calculating a weighted average of the pixel values.

Accordingly, the pixel value at the sub-pel position can be appropriately interpolated.

Furthermore, in the calculating, the integer slope may be calculated solely for the current block, and in the determining, the sub-pel position may be determined for each of the pixel positions within the current block, using the integer slope that is common to the pixel positions.

Since one integer slope is calculated for the current block, the computation load can be suppressed.

The present invention can be implemented not only as such a spatial prediction method but also as an apparatus and an integrated circuit each of which predicts a space by the spatial prediction method, as a program causing a computer to predict a space according to the spatial prediction method, and as a recording medium that stores the program. Furthermore, the present invention can be also implemented as an image coding apparatus and an integrated circuit each of which codes an image using the space predicted by the spatial prediction method, an image coding method for coding the image as such, a program causing a computer to code the image according to the image coding method, and a recording medium that stores the program. Furthermore, the present invention can be also implemented as an image decoding apparatus and an integrated circuit each of which decodes an image using the space predicted by the spatial prediction method, an image decoding method for decoding the image as such, a program causing a computer to decode the image according to the image decoding method, and a recording medium that stores the program.

A spatial prediction device according to an aspect of the present invention is a spatial prediction device that spatially predicts a pixel value at each pixel position within a current block included in an image, and the device includes: a detection unit configured to detect an edge that overlaps the current block by obtaining a horizontal gradient and a vertical gradient between pixels within a block adjacent to the current block; a calculation unit configured to calculate an integer slope based on at least one of the horizontal gradient and the vertical gradient, the integer slope indicating an integer value of a slope of the detected edge; a determining unit configured to determine a sub-pel position for each of the pixel positions within the current block, the sub-pel position being an intersection between (i) a line that has the calculated integer slope and passes through the pixel position and (ii) a boundary of the adjacent block; and a prediction unit configured to predict, for each of the pixel positions, the pixel value at the pixel position based on a pixel value interpolated in the sub-pel position determined for the pixel position, wherein the boundary of the adjacent block is a row or a column that is closest to the current block, among a plurality of rows or a plurality of columns of pixels included in the adjacent block.

Furthermore, the calculation unit may be configured to scale the one of the horizontal gradient and the vertical gradient by a c-th power of 2, and calculate the integer slope using the scaled one of the horizontal gradient and the vertical gradient, c being a positive integer, and the determining unit may be configured to calculate the sub-pel position for the pixel position by multiplying the integer slope generated by the scaling by a coordinate value horizontal or vertical to the pixel position to be predicted within the current block.

The spatial prediction device may further include a coefficient calculation unit configured to calculate the value of c using a function of the one of the horizontal gradient (Gy) and the vertical gradient (Gx).

Furthermore, the calculation unit may be configured to obtain a result of a division with reference to a division table stored in a memory, and calculate the integer slope using the obtained result of the division, the division using, as a divisor, a value indicating the one of the horizontal gradient (Gy) and the vertical gradient (Gx), and the division table indicating, for each predetermined value, the predetermined value and a result of a division using the predetermined value as a divisor.

Furthermore, a maximum value of the predetermined value indicated in the division table may be a b-th power of 2, b being an integer, and when the value indicating the one of the horizontal gradient (Gy) and the vertical gradient (Gx) used as the divisor exceeds the b-th power of 2, the calculation unit may be configured to scale the one of the horizontal gradient and the vertical gradient by shifting bits of the value to the right to obtain the result of the division using, as a divisor, a value indicating the scaled one of the horizontal gradient and the vertical gradient.

Furthermore, the calculation unit may be configured to calculate the integer slope by dividing a value indicating one of the horizontal gradient (Gy) and the vertical gradient (Gx) by a value indicating the other of the horizontal gradient and the vertical gradient, and the prediction unit may be configured to set weights according to a distance, in the boundary, between the sub-pel position determined for the pixel position and each of full-pel positions adjacent to the sub-pel position, and interpolate the pixel value at the sub-pel position by setting a corresponding one of the weights to each pixel value of the full-pel positions and calculating a weighted average of the pixel values.

Furthermore, the calculation unit may be configured to calculate the integer slope solely for the current block, and the determining unit may be configured to determine the sub-pel position for each of the pixel positions within the current block, using the integer slope that is common to the pixel positions.

The spatial prediction method according to the present invention can reduce the complexity of spatial prediction.

BRIEF DESCRIPTION OF THE DRAWINGS

FIG. 4C illustrates an example in which an edge enters the block to be predicted from the left side according to Embodiment 1.

FIG. 4D illustrates another example of an edge direction according to Embodiment 1.

FIG. 14 illustrates a structure of multiplexed data.

FIG. 17 illustrates a structure of TS packets and source packets in the multiplexed data.

FIG. 18 illustrates a data structure of a PMT.

FIG. 25 illustrates an example of a look-up table in which the standards of video data are associated with the driving frequencies.

FIG. 26A illustrates an example of a configuration for sharing a module of a signal processing unit.

FIG. 26B illustrates another example of a configuration for sharing a module of a signal processing unit.

DETAILED DESCRIPTION OF THE INVENTION

Embodiments for implementing the present invention will be described with reference to drawings.

Embodiment 1

Figure 1:
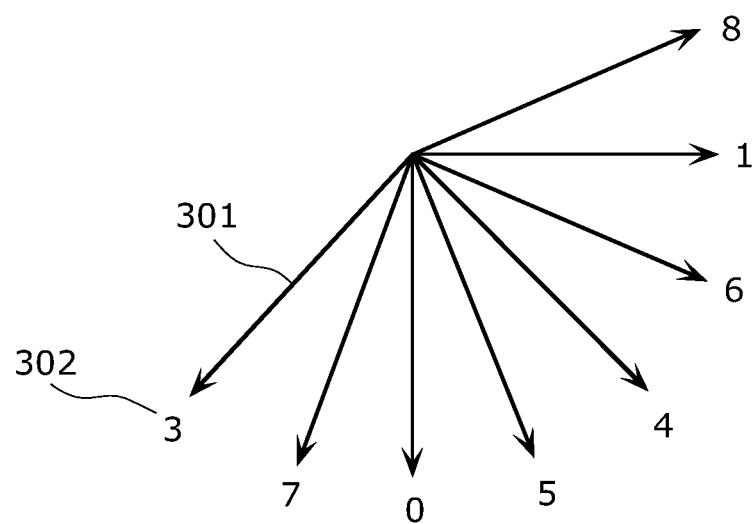
FIG. 1 schematically illustrates eight directional prediction modes used for the subblocks of 4×4 pixels.
Figure 2:
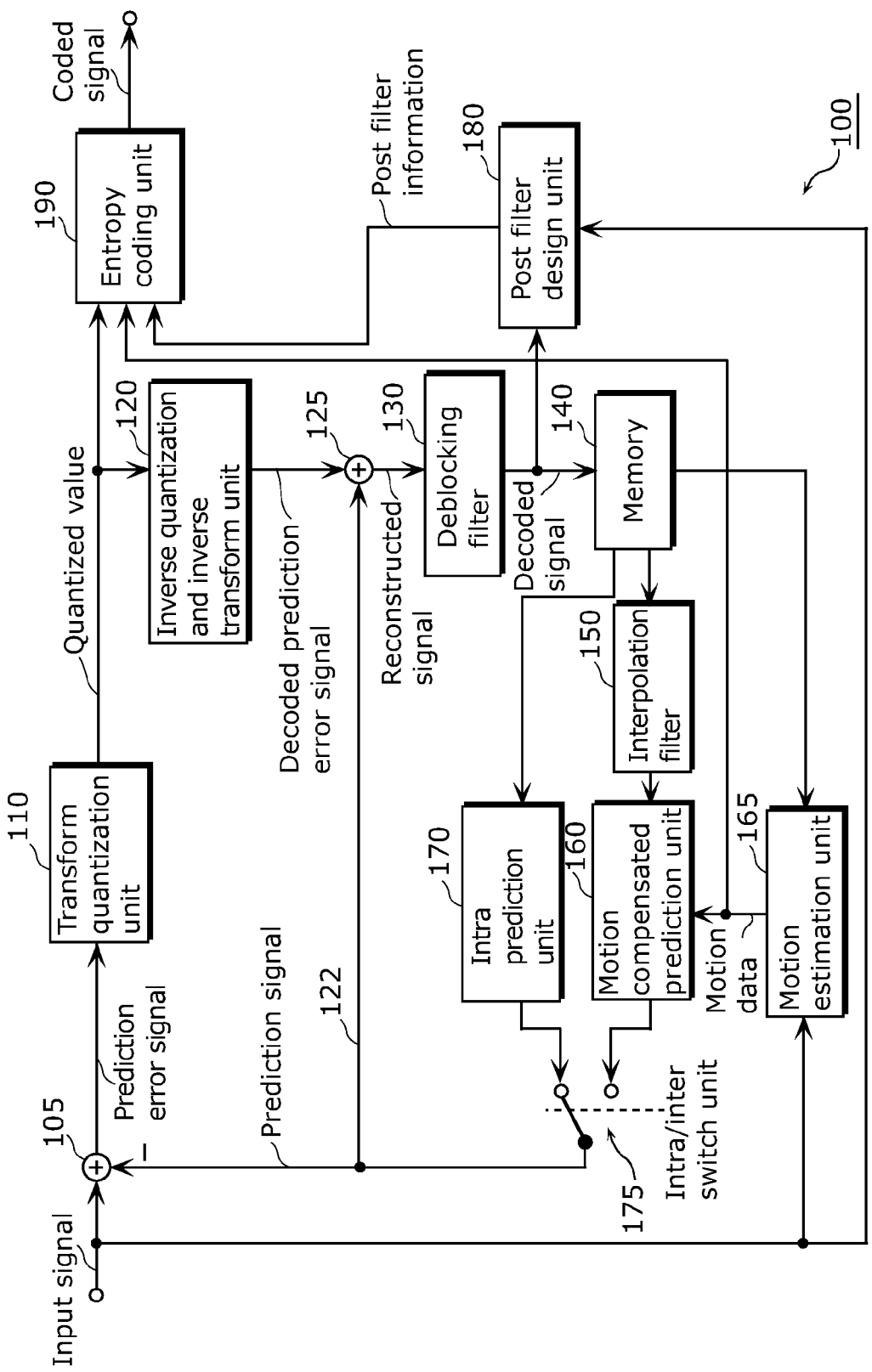
FIG. 2 is a block diagram of an image coding apparatus according to Embodiment 1 of the present invention.

FIG. 2 is a block diagram illustrating an example of an encoder 100 according to Embodiment 1. The encoder 100 includes a subtracting unit 105, a transform quantization unit 110, an inverse quantization and inverse transform unit 120, an adding unit 125, a deblocking filter 130, a memory 140, an interpolation filter 150, a motion compensated prediction unit 160, a motion estimation unit 165, an intra prediction unit 170, an intra/inter switch unit 175, a post filter design unit 180, and an entropy coding unit 190.

The subtracting unit 105 first determines differences (prediction error signal, residual signal, or prediction error block) between a current block to be coded of an input video signal (input signal) and a corresponding predicted block (prediction signal) predicted for the current block. The prediction signal (predicted block) is obtained either by a temporal prediction (inter prediction) or by a spatial prediction. The type of prediction can be varied on a per frame basis, on a per slice basis, or on a per macroblock basis.

The predictive coding using the temporal prediction is referred to as inter coding, and the predictive coding using the spatial prediction is referred to as intra coding. The type of prediction for a video frame can be set by the user or selected by the encoder 100 so as to achieve a possibly high compression gain. The intra/inter switch 175 provides a corresponding prediction signal to the subtractor 105 according to the selected prediction type. The prediction signal using temporal prediction is derived from the previously coded images which are stored in the memory 140. The prediction signal using spatial prediction is derived from the values of boundary pixels in the neighboring blocks of the same frame, which have been previously coded, decoded, and stored in the memory 140. The memory 140 thus operates as a delay unit that allows a comparison between current signal values (pixel values) to be coded and the prediction signal values (pixel values) generated from previous signal values. The memory 140 can store a plurality of previously coded (and decoded) frames. The transform quantization unit 110 transforms the differences between the input signal and the prediction signal into coefficients (frequency coefficients), and quantizes the differences. The differences are represented by a prediction error signal or a residual signal. The entropy coding unit 190 performs entropy coding on the quantized coefficients (coded video image or coded video sequence) in order to further reduce the amount of data in a lossless way. This is mainly achieved by applying a code to code words of variable length wherein the length of a code word is chosen based on the probability of its occurrence. The entropy coding unit 190 outputs the coded signal (bitstream) including the entropy-coded video.

Intra-coded images (called also I-type images or I frames) consist solely of macroblocks that are intra-coded, i.e. the intra-coded images can be decoded without reference to any other previously decoded image. The intra-coded images provide error resilience for the coded video sequence (coded video image) since they refresh the coded video sequence from errors possibly propagated from frame to frame due to temporal prediction. Moreover, I frames enable a random access within the sequence of coded video images.

The intra prediction unit 170 uses a predefined set of intra-prediction modes. Some of the intra-prediction modes predict the current block using the boundary pixels of the neighboring blocks already coded. Other intra-prediction modes, as template matching for example, use a search area made of already coded pixels belonging to the same frame.

The predefined set of intra-prediction modes includes some directional spatial intra-prediction modes. The different modes of directional intra-prediction refer to different directions of the applied two-dimensional prediction. This allows efficient spatial intra-prediction in the case of various edge directions. The subtractor 105 subtracts the prediction signal obtained by such an intra-prediction from the input signal as described above. Furthermore, the intra prediction unit 170 outputs intra-prediction mode information (not shown in FIG. 2) indicating the intra prediction mode to the entropy coding unit 190. The entropy coding unit 190 entropy-codes the intra-prediction mode information, and outputs the entropy-coded intra-prediction mode information together with the coded signal. The intra prediction unit 170 according to Embodiment 1 further performs the distinctive spatial prediction aside from such processing. The distinctive spatial prediction will be described later.

Within the encoder 100, a decoding unit is incorporated for obtaining a decoded signal (local decoded signal). In other words, the encoder 100 includes the inverse quantization and inverse transform 120 so that the decoding is performed according to the coding processing. The inverse quantization and inverse transform unit 120 performs inverse quantization and inverse orthogonal transform (inverse frequency transform) on the quantized value obtained by performing orthogonal transform (frequency transform) and quantization on the prediction error signal. As a result, the inverse quantization and inverse transform unit 120 generates and outputs a decoded prediction error signal.

The decoded prediction error signal differs from the original prediction error signal due to the quantization error called also quantization noise. The adding unit 125 adds the decoded prediction error signal to the prediction signal to obtain a reconstructed signal (reconstructed image). In order to maintain the compatibility between the encoder 100 (image coding apparatus) and the decoder (image decoding apparatus), the constituent elements of the interpolation filter 150, the intra prediction unit 170, and the motion compensated prediction unit 160 obtain the prediction signal based on the coded and subsequently decoded input signal (decoded signal) which is known at both of the encoder 100 and the decoder. Due to the quantization, quantization noise is superposed to the reconstructed signal. Due to the block-wise coding, the superposed noise often has blocking characteristics, which results, in particular for strong quantization, in visible block boundaries in the reconstructed image (image indicated by the reconstructed signal). In order to reduce these artifacts, the deblocking filter 130 performs deblocking filtering on every reconstructed image block. The deblocking filter 130 stores the reconstructed signal on which the deblocking filtering has been performed, as a decoded signal in the memory 140.

In order to be decoded, the images coded by inter coding (inter-coded images) require previously coded and subsequently decoded image (image indicated by the decoded signal). Temporal prediction (inter prediction) may be performed uni-directionally, i.e., using only frames ordered in time before the current frame to be coded, or bi-directionally, i.e., using also frames following the current frame. Uni-directional temporal prediction results in inter-coded images called P frames (P-pictures); and bi-directional temporal prediction results in inter-coded images called B frames (B-pictures). In general, an inter-coded image may be composed of any of P-, B-, or even I-type macroblocks. An inter-coded macroblock (P- or B-macroblock) is predicted by employing the motion compensated prediction unit 160. First, a best-matching block is found for the current block within the previously coded and decoded frames by the motion estimation unit 165. Then, the motion compensated prediction unit 160 outputs the best-matching block as a prediction signal. Furthermore, the motion estimation unit 165 outputs, to the motion compensated prediction unit 160, motion data that indicates relative displacement between the current block and its best-matching block and is data having the three-dimensional form (one temporal axis, two spatial axes) within the bitstream. In order to optimize the prediction accuracy, the interpolation filter 150 transforms the resolution of a reference image (decoded image) into a spatial sub-pel resolution e.g. half-pel or quarter-pel resolution. In other words, the interpolation filter 150 interpolates sub-pixels in the reference image. Accordingly, the motion estimation unit 165 estimates a motion vector of sub-pel precision.

The transform quantization unit 110 performs orthogonal transform (frequency transform) on and quantizes the prediction error signal indicating the differences between the current input signal and the prediction signal, in the intra- and the inter-coding modes, resulting in generation of the quantized value that is quantized coefficients (frequency coefficients). Generally, an orthogonal transform such as a two-dimensional discrete cosine transform (DCT) or an integer version thereof is employed since it reduces the correlation of the natural video images efficiently. After the transform, low frequency components are usually more important for image quality than high frequency components so that more bits can be spent for coding the low frequency components than those of the high frequency components. The entropy coding unit 190 converts the two-dimensional matrix of the quantized values into a one-dimensional array. Typically, this conversion is performed by a so-called zig-zag scanning, which starts with the DC-coefficient in the upper left corner of the two-dimensional array and scans the two-dimensional array in a predetermined sequence ending with an AC coefficient in the lower right corner. As the energy is typically concentrated in the upper left part of the two-dimensional matrix of coefficients, corresponding to the lower frequencies, the zig-zag scanning results in an array where usually the last values are zero. This allows for efficient coding using run-length codes as a part of/before the actual entropy coding.

Furthermore, the transform quantization unit 110 employs scalar quantization which can be controlled by a quantization parameter (QP) and a customizable quantization matrix (QM). The transform quantization unit 110 selects one of 52 quantization parameters according to the coefficients to be quantized, for each macroblock. In addition, a quantization matrix is specifically designed to keep certain frequencies in the source to avoid losing image quality. Quantization matrix can be adapted to the coded video sequence and signalized together with the bitstream.

The bitstream (coded signal) includes two functional layers, a Video Coding Layer (VCL) and a Network Abstraction Layer (NAL). The VCL provides the coding functionality as briefly described above. The NAL encapsulates information elements into standardized units called NAL units according to their further application such as transmission over a channel or storing in storage. The information elements are, for instance, the coded prediction error signal (coded video image) or other information necessary for the decoding of the coded video image (for example, type of prediction, quantization parameter, and motion vectors). There are VCL NAL units containing the coded video image and the related information, as well as non-VCL units encapsulating additional data such as parameter set relating to an entire coded video sequence, or Supplemental Enhancement Information (SEI) providing additional information that can be used to improve the decoding performance.

The post filter design unit 180 designs post filter information, such as filter coefficients for improving the image quality, based on the decoded signal and the input signal, and outputs the post filter information to the entropy coding unit 190. The post filter design unit 180 sends the post filter information via SEI of the bitstream (SEI message). In other words, the post filter design unit 180 compares the locally decoded signal and the original input signal so that the encoder 100 determines the post filter information. In general, the post filter information is information for allowing a decoder to set up an appropriate filter. The post filter information may be directly the filter coefficients or another information enabling setting up the filter coefficients. The post filter information, which is output by the post filter design unit 180 is also fed to the entropy coding unit 190 in order to be coded and inserted into the coded signal.

Figure 3:
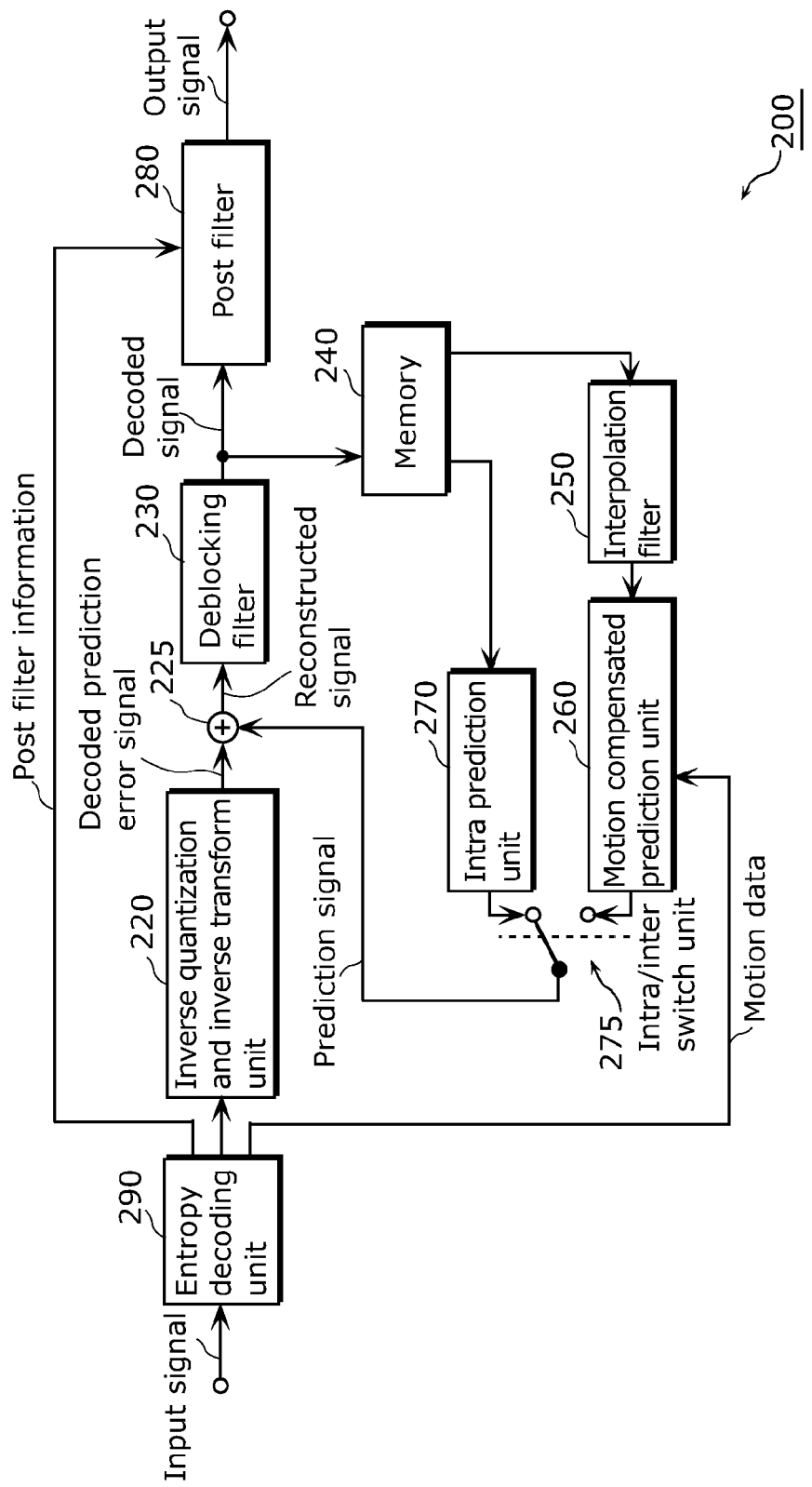
FIG. 3 is a block diagram of an image decoding apparatus according to Embodiment 1.

FIG. 3 is a block diagram illustrating an example of a decoder 200 that is an image decoding apparatus according to Embodiment 1. The decoder 200 is an apparatus that decodes a coded signal generated by the encoder 100, and includes an inverse quantization and inverse transform unit 220, an adding unit 225, a deblocking filter 230, a memory 240, an interpolation filter 250, a motion compensated prediction unit 260, an intra prediction unit 270, an intra/inter switch 275, a post filter 280, and an entropy decoding unit 290. The inverse quantization and inverse transform unit 220, the adding unit 225, the deblocking filter 230, the memory 240, the interpolation filter 250, the motion compensated prediction unit 260, the intra prediction unit 270, and the intra/inter switch 275 perform the same processing as the inverse quantization and inverse transform unit 120, the adding unit 125, the deblocking filter 130, the memory 140, the interpolation filter 150, the motion compensated prediction unit 160, the intra prediction unit 170, the intra/inter switch unit 175 that are included in the encoder 100, respectively.

More specifically, the entropy decoding unit 290 obtains a bitstream that is a coded signal (input signal to the decoder 200). The entropy decoding unit 290 entropy-decodes the quantized values (coded video image), the information elements necessary for decoding such as motion data, mode of prediction etc., and the post filter information. The entropy decoding unit 290 extracts, from the bitstream, the intra-prediction mode information indicating the type/mode of the spatial prediction applied to the block to be decoded as necessary. The entropy decoding unit 290 outputs the extracted intra-prediction mode information to the intra prediction unit 270. The inverse quantization and inverse transform unit 220 obtains the quantized values arranged in a one-dimensional array, and inversely scans the quantized values in order to obtain a two-dimensional matrix. Furthermore, the inverse quantization and inverse transform unit 220 performs inverse quantization and inverse transform on the quantized values to obtain a decoded prediction error signal corresponding to a difference obtained by subtracting the prediction signal from the input signal of the encoder 100.

The adding unit 225 obtains a prediction signal from either the motion compensated prediction unit 260 or the intra prediction unit 270. The intra/inter switch 275 switches between the temporal prediction performed by the motion compensated prediction unit 260 and the spatial prediction performed by the intra prediction unit 270. In other words, prediction is switched according to switching information for signaling the prediction applied by the encoder 100. The switching information further includes the information necessary for predicting (i) a prediction type in the case of intra-prediction (intra-prediction mode information), and (ii) motion data in the case of motion compensated prediction. Depending on the current value of the motion vector, interpolation of pixel values may be needed in order to perform the motion compensated prediction. This interpolation is performed by the interpolation filter 250. The adding unit 225 adds the decoded prediction error signal in the spatial domain to the prediction signal obtained either from the motion compensated prediction unit 260 or the intra prediction unit 270.

The deblocking filter 230 obtains the reconstructed image (reconstructed signal) obtained by the adding, performs the deblocking filtering on the image, and stores the resulting decoded signal in the memory 240. The decoded signal is applied to the temporal or spatial prediction of the following blocks. The post filter 280 obtains the post filter information for setting up post filtering. The post filter 280 then performs the post filtering on the decoded signal in order to further improve the image quality. Accordingly, the input signal that is the coded signal is decoded, and the decoding result is output as an output signal.

The distinctive processing performed by the intra prediction units 170 and 270 according to Embodiment 1 will be described in detail.

The problem underlying the present invention is based on the observation that the efficiency of the spatial (intra) prediction applied to an image and video coding can be increased by improving the precision of the edge detection and subsequent prediction. On the other hand, improving the edge detection and prediction requires more computational power and applying more complex operations such as divisions. This may cause difficulties in efficiently implementing such more complex approaches. For instance, employing only integer arithmetic for image processing speeds up the coding and decoding and enables efficient implementations on general purpose processors, digital signal processors, or in specialized or programmable hardware. However, depending on the precision of the integer, operations such as multiplications and divisions may lead to overflows and/or decreased precision.

In order to increase the prediction performance of the intra-prediction, the intra prediction units 170 and 270 employ an improved intra prediction. In particular, the improved intra-prediction relies on edge detection and calculates an intersection between a block boundary (or a plurality of them) and the edge detected as dominant. The intersection may be at a sub-pel position, and the interpolation is performed based on such a sub-pel position. A corresponding example of intra-prediction method is disclosed, for instance, in PTL 1. The intra prediction units 170 and 270 can more efficiently perform the directional spatial prediction with low-complexity in comparison with the intra-prediction method disclosed in PTL 1.

In general, edges in an image may be detected by determining a gradient vector field (gradient vector or gradient field) of the image (between pixels). A gradient vector is larger on an edge and is perpendicular thereto. One of the most popular approaches to detecting the gradient field is convolution of the image with the vertical and horizontal Sobel operators. The operators are expressed by the following masks (Equations 1 and 2).

[Math 1]

$$S_x = \begin{bmatrix} -1 & 0 & 1 \\ -2 & 0 & 2 \\ -1 & 0 & 1 \end{bmatrix} \quad \text{(Equation 1)}$$

[Math 2]

$$S_y = \begin{bmatrix} -1 & -2 & -1 \\ 0 & 0 & 0 \\ 1 & 2 & 1 \end{bmatrix} \quad \text{(Equation 2)}$$

In particular, a vertical gradient vector coordinate (vertical coordinate or vertical gradient) Gx and a horizontal gradient vector coordinate (horizontal coordinate or horizontal gradient) Gy in a particular pixel p(x, y) are then obtained by filtering the pixel p(x, y) with the vertical Sobel mask Sx and the horizontal Sobel mask Sy, respectively. Many applications employ a Sobel operator for obtaining the gradient field. However, the present invention is not limited to detecting the gradient field by means of the Sobel operator. In general, any edge detection method that provides the gradient field may be employed. For instance, masks with other sizes than the Sobel operator may be used such as 2×2 or 4×4, or even larger masks may be used. The selection of the particular mask depends on the desired results. Employing larger masks may add on precision of the edge detection and suppress detection of small local edges, but on the other hand, it increases the computational complexity. Alternatively, masks other than the Sobel mask may be used for edge detection, such as a Scharr operator, or operators based on higher derivatives.

After obtaining the vertical coordinate Gx and the horizontal coordinate Gy of the gradient G, for a plurality of pixels of blocks surrounding the block to be predicted, a dominant gradient or a dominant edge vector can be determined. A dominant edge vector (simply referred to as edge) E with the horizontal coordinate (horizontal components) Ex and the vertical coordinate (vertical components) Ey is perpendicular to the gradient vector G. Correspondingly, the sizes of the horizontal components Ex and the vertical components Ey of the dominant edge vector E correspond to the sizes of horizontal gradient Gy and vertical gradient Gx, respectively (for instance, Ex=−Gy, Ey=Gx for a counter-clock rotation). Typically, the dominant edge for the current block to be predicted is determined to be an edge with a maximum norm out of edges (edges that overlap the current block) that intersect the current block. However, other methods may be used as well, for instance, taking a weighted average of the edges, or the edge direction detected for a majority of pixels, etc.

It should be noted that the calculation of gradient is not necessarily performed for all pixels of the adjacent blocks (neighboring blocks adjacent to the current block to be predicted). In general, it is advantageous to only calculate the gradient vector for pixels near the boundaries of the neighboring block adjacent to the block to be interpolated (current block to be predicted). By calculating the gradient vector only for a subset of pixels in the adjacent block, the complexity is reduced. In particular, the rows and/or columns directly adjacent to the current block are not well-suited for application of a Sobel mask (or other gradient vector detecting masks) since the mask would only partially overlap the adjacent block. Therefore, preferably, the second and/or third nearest row or column of pixels adjacent to the current clock are used to calculate the gradient vector. However, the present invention is not limited thereto and other pixels in the adjacent block may be used as well.

Moreover, for the prediction, only the edges entering the block to be predicted are of importance, thus edge detection near the boundaries also reduces the risk of detecting a false edge.

Figure 4A:
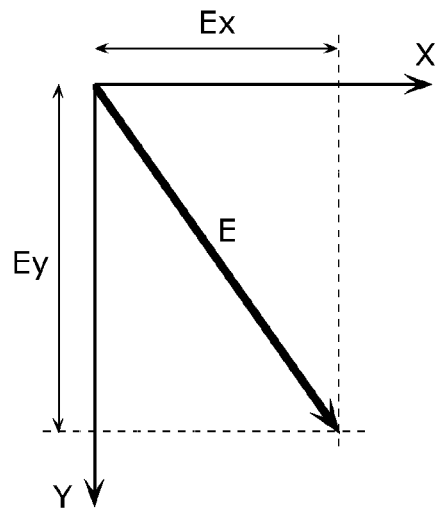
FIG. 4A illustrates an edge vector and its projections into the orthogonal axes X and Y according to Embodiment 1.
Figure 4B:
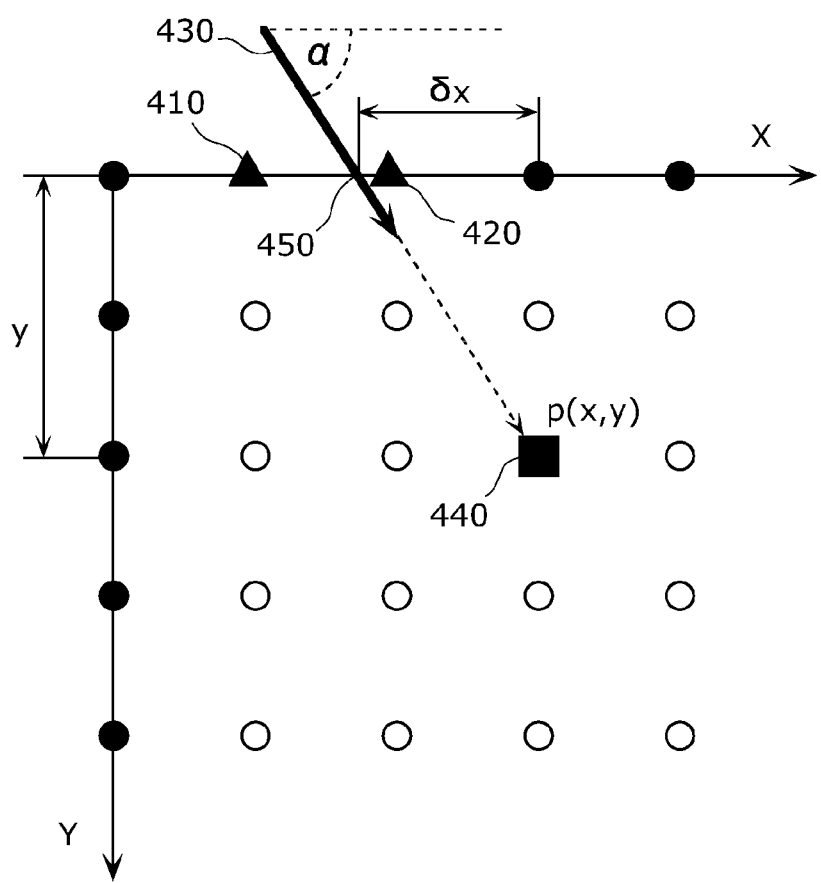
FIG. 4B shows a raster of a 4×4 pixels of the block to be extrapolated that is a block to be predicted by extrapolation according to Embodiment 1.

FIG. 4A illustrates the edge vector E and its projections Ex and Ey (corresponding to gradients Gy and Gx, respectively) into the orthogonal axes X and Y. FIG. 4B shows a raster of a 4×4 pixels of the block to be extrapolated (predicted). In particular, white circles and a black square 440 represent pixels of the block to be extrapolated. The black square 440 represents a current pixel p(x, y) whose value is to be extrapolated in an example below. Orthogonal axis X leads through a bottom row of pixels belonging to a block adjacent to the block to be predicted on its top side. The pixels of the row are illustrated as black triangles or black circles. Orthogonal axis Y leads through an utmost right column of pixels belonging to a block adjacent to the block to be predicted on its left side. The pixels of the column are illustrated as black circles.

An arrow 430 illustrates the edge detected as a dominant edge (dominant edge vector) E entering the block to be predicted. A dashed arrow illustratively extrapolates the dominant edge up to the current pixel p(x, y). The dominant edge E enters the block to be predicted at an angle α at a sub-pel 450 between two full-pels (integer pel) 410 and 420 (illustrated as two black triangles). The sub-pel 450 needs to be interpolated based on its distance to each of the two closest full-pels 410 and 420.

In order to preserve the sharpness, position and direction of the edge as far as possible, the current pixel 440 is extrapolated along the edge direction based on the values of both of the full-pels 410 and 420.

[Math 3]

$$p(x,y) = w_1 \cdot p(x-\lfloor \delta x \rfloor, 0) + w_2 \cdot p(x-\lceil \delta x \rceil, 0) \quad \text{(Equation 3)}$$

Here, $w_1$ and $w_2$ are weights, which are preferably determined based on the distance from the intersection (sub-pel) 450 to each of the full-pels 410 and 420. It is assumed that the point (0,0) lies near to the top left corner of the block to be predicted. In Equation 3, the value multiplied by the weight $w_1$ of the first right side indicates the pixel value of the full-pel 420, and the value multiplied by the weight $w_2$ of the second right side indicates the pixel value of the full-pel 410. Furthermore, δx indicates a positive value when an edge is along a direction from the upper left to the lower right as the edge 430 as illustrated in FIG. 4B. Furthermore, δx indicates a negative value when an edge is along a direction from the upper right to the lower left. For instance, the weights $w_1$ and $w_2$ may be calculated as Equation 4 below.

[Math 4]

$$w_1 = \lceil \delta x \rceil - \delta x$$

and $$w_2 = \delta x - \lfloor \delta x \rfloor \quad \text{(Equation 4)}$$

Here, δx is distance between the X coordinate of the current pixel 440 and the X coordinate of the intersection 450. The operator indicated by Expression 5 denotes the "floor" operation, which returns for a real operand its nearest smaller integer (in this example equal to 1). The operator indicated by Expression 6 denotes the "ceil" operation, which returns for a real operand its nearest greater integer (in this example equal to 2).

[Math 5]

$$\lfloor \cdot \rfloor \quad \text{(Expression 5)}$$

[Math 6]

$$\lceil \cdot \rceil \quad \text{(Expression 6)}$$

As can be seen in FIG. 4B, the slope k of the edge 430 may be calculated as Equation 7 below.

[Math 7]

$$k = \tan(\alpha) = \frac{Ey}{Ex} = \frac{y}{\delta x} \quad \text{(Equation 7)}$$

Thus, the distance δx may be calculated as Equation 8 below.

[Math 8]

$$\delta x = \frac{y \cdot Ex}{Ey} \quad \text{(Equation 8)}$$

Thus, the calculation of δx requires a division. In general, for each pixel of the block to be predicted, the distance δx from the X coordinate of the pixel to be predicted to the X coordinate of the intersection between the edge and the row of pixels of the top neighboring block (intersection to be interpolated between pixels in the row) is computed. Based on the calculated distance δx, then the current pixel 440, that is, the pixel value of the current pixel 440 p(x, y) is predicted as p(x, y)=p(x−δx, 0), which means that the current pixel 440 (the pixel value of the current pixel 440) is extrapolated as a value of the interpolated sub-pel 450.

According to Embodiment 1, all the above parameters are typically integer values with a given precision and the operations applied are integer operations. For instance, parameters Ex and Ey may be represented by corresponding 8 bits long variables. In such a case, the distance δx is also calculated using integer arithmetic by performing an integer multiplication y×Ex and then by dividing the result by Ey. In integer arithmetic division, the result is also an integer, thus, the integer division may slightly reduce the precision. In general, the reduction of precision gets higher for smaller values to be divided (y×Ex) and for greater values of a divisor (Ey).

In order to reduce the number of operations performed for predicting a block of pixels as described above, the number of divisions to be performed is reduced by calculating first the slope k of the edge E which is common for all pixels of the block to be predicted. The calculated slope k is to be stored as an integer slope K=int(Ex/Ey) with a predefined precision. The computed integer slope K is then used to calculate the distance δx for the current pixel to be predicted as Equation 9 below.

[Math 9]

$$\delta x = y \cdot \text{int}\left(\frac{Ex}{Ey}\right) \quad \text{(Equation 9)}$$

Here, the notation "int" emphasizes the fact that the operand is an integer with a predefined precision. Accordingly, the division employed for computing the slope is only performed once for the entire block of pixels to be predicted. Moreover, since the Y coordinate of a pixel to be predicted remains the same in the same row of pixels, the distance δx only needs to be calculated once per row of pixels in the block to be interpolated (predicted). The precision of the integer is typically selected according to the implementation environment. It may be, for instance 8-bits, which is usual especially in image processing since the input pixel components are also typically sampled with 8 bits. However, the precision may be also higher such as 12, 16, or any other number of bits, or even lower than 8 bits.

However, performing the integer division Ex/Ey only once per block and then obtaining row-wise the distance δx may lead to reduction of the precision with respect to the solution in which the integer multiplication y×Ex is performed first and then the result is divided by Ey. This is caused by the fact that the number Ex to be divided is smaller. Moreover, the subsequent multiplication of the integer slope by the coordinate Y results in further multiplicative increase of imprecision differently for different rows. In particular, the precision will be lower for higher values of y.

In order to further enhance the precision of the computation while still keeping the advantage of a single division per block, the integer slope is obtained by multiplying the number to be divided by a scaling factor $2^c$, as indicated by Equation 10, where c is an integer. $\delta x_{block}$ denotes an integer slope obtained by multiplying a scaling factor.

[Math 10]

$$\delta x_{block} = \frac{2^c \cdot Ex}{Ey} \quad \text{(Equation 10)}$$

Advantageously, c is a positive integer. The value of c may be, for instance, any value such as a value between 1 and 4.

However, other values are also possible. The particular value may be selected taking into account the block size. For instance, a possible value for c could be 4. The largest block size is 16×16, resulting in the highest value of y being 16 ($2^4$=16). Similarly, the value of c for blocks of size 4×4 could be 2, and the value could be 3 for blocks of size 8×8. This multiplication is equivalent to shifting, to the left, c bits of the number Ex to be divided. This enlarges the value to be divided and, thus, the division by the divisor Ey will gain on precision. The distance δx can then be obtained as Equation 11 below.

[Math 11]

$$\delta x = y \cdot \delta x_{block} \quad \text{(Equation 11)}$$

Here, the respective weights $w_1$ and $w_2$ can be calculated as Equations 12 and 13 below.

[Math 12]

$$w_1 = (((\delta x + 2^c) >> c) << c) - \delta x \quad \text{(Equation 12)}$$

[Math 13]

$$w_2 = \delta x - ((\delta x >> c) << c) \quad \text{(Equation 13)}$$

Alternatively, the respective weights w1 and w2 can be calculated as Equations 14 and 15 below.

[Math 14]

$$w_2 = \delta x \& (2^c - 1) \quad \text{(Equation 14)}$$

[Math 15]

$$w_1 = 2c - w_2 \quad \text{(Equation 15)}$$

Here, the operation ">>" denotes shifting c bits to the right, which corresponds to rescaling back by dividing the result by the applied scaling factor $2^c$. The operation "<<" denotes shifting c bits to the left, which corresponds to multiplying by the scaling factor $2^c$. The operation "&" denotes the bit-wise logical operator "AND".

The values of δx and the weights $w_1$ and $w_2$ are non-shifted and are scaled by the factor $2^c$. The right shift to divide the final result by the applied scaling factor $2^c$ must be done after interpolation of the sub-pel. In other words, the pixel value of the current pixel p(x, y) can be calculated as Equation 16 below.

[Math 16]

$$p(x,y) = w_1 \cdot p(x - (\delta x >> c), 0) + w_2 \cdot p(x - ((\delta x - 2^c) >> c), 0) + 2^{c-1}) >> c \quad \text{(Equation 16)}$$

Here, the offset $2^{c-1}$ serves for rounding the final value to the nearest integer. In the case where the precision of the value Ex has been increased beforehand by multiplying it by $2^p$, p being an integer (6 is a good value), the increase of precision through the factor $2^c$ has for only purpose to divide by $2^c$ the error introduced through the multiplication by y. For example, the value of the integer slope is obtained by Equation 17 below.

[Math 17]

$$\delta x_{block} = \frac{2^c \cdot (Ex << p)}{Ey} \quad \text{(Equation 17)}$$

Here, the distance δx can then be obtained as Equation 18 below. The error introduced through the division operation is multiplied by $y/2^c$ and the distance δx is scaled by the factor $2^p$. The scaling is necessary to calculate the distance in integer arithmetic while keeping the possibility to have a sub-pel position for the intersection.

[Math 18]

$$\delta x = (y \cdot \delta x_{block} + 2^{c-1}) >> c \qquad \text{(Equation 18)}$$

The weights $w_1$ and $w_2$ can be obtained as Equations 19 and 20 below.

[Math 19]

$$w_2 = \delta x \& (2^p - 1) \qquad \text{(Equation 19)}$$

[Math 20]

$$w_1 = 2^p - w_2 \qquad \text{(Equation 20)}$$

The pixel value of the current pixel p(x, y) that is a prediction value can be calculated as Equation 21 below.

[Math 21]

$$p(x,y) = w_1 \cdot p(x-(\delta x >> p), 0) + w_2 \cdot p(x-((\delta x + 2^p) >> p), 0) + 2^{p-1}) >> p \qquad \text{(Equation 21)}$$

This calculation of the distance δx from the X coordinate of the current pixel 440 to be predicted to the X coordinate of the intersection of the edge with the row of pixels adjacent to the block to be predicted on the top enables increasing the precision of the division. However, due to multiplication by y, the multiplications may result in rather high values, which, on the other hand, may cause an overflow, depending on the integer precision supported by the computing environment.

In order to maintain the increased precision of the division while avoiding the overflow, the scaling factor $2^c$ is selected according to the value of the vertical gradient Gy, corresponding to the value of Ex as indicated by Equation 22. According to Embodiment 1, each of the intra prediction units 170 and 270 may include a coefficient calculation unit that calculates c and the scaling factor $2^c$.

[Math 22]

$$c = f(Ex) \qquad \text{(Equation 22)}$$

Here, function f( ) is an arbitrary function. Advantageously, the value of c is lower for higher values of Ex. One example for the function f( ) is expressed by Equation 23.

[Math 23]

$$c = 8 - int(\log_2(|E_x|)) \qquad \text{(Equation 23)}$$

In such a case, c is equal to 8 for Ex equal to 1, c is equal to 1 for Ex equal to 128, and c is equal to 0 for Ex equal to 256. If more bits are available in the system, one could define the following function of Equation 24 below.

[Math 24]

$$c = b - int(\log_2(|E_x|)) \qquad \text{(Equation 24)}$$

Here, b is the maximum number of bits available in the system. Generally, the maximum possible precision should be used when Ex is small (equal to 1 for example), and the maximum precision minus 8 bits should be used when Ex is big (close to 256). When calculating the parameter c, the sign of the edge vector coordinate Ex is not important and thus c may, in general, also be calculated as c=f(|Ex|).

In accordance with another embodiment of the present invention, the division for calculating the integer slope of the edge is completely avoided. This is facilitated by replacing the division with referring to a table (division table). Accordingly, a table is stored in a memory. The memory may be either an internal memory of the interpolation computing system (intra prediction unit) or an external memory. The table is composed of a limited number of divisors and a result of dividing a predefined value. For instance, the table may include entries with a result of a division of a number $2^a$ by various values of Ey as indicated by Equation 25 below.

[Math 25]

$$\text{Table}[|Ey|] = int\left(\frac{2^a}{|Ey|}\right) \qquad \text{(Equation 25)}$$

Here, a is a positive integer. For example, a can be equal to the value of the precision p described previously. In order to perform processing using the table instead of the division, preferably, the table division scaling factor $2^a$ is a function of the divisor size |Ey| as indicated by Equation 26 below.

[Math 26]

$$a = g(|Ey|) \qquad \text{(Equation 26)}$$

The function g( ) is an arbitrary function. Advantageously, the value of the scaling parameter a is higher for higher size (absolute value) of Ey. One example for the function g( ) is expressed by Equation 27.

[Math 27]

$$a = b + int(\log_2(|E_y|)) \qquad \text{(Equation 27)}$$

Here, b is chosen so that the value b+8 does not overflow the number of bits available in the system. Generally the maximum possible precision should be used for Ey that is big (close to 256) and a lower precision should be used for Ey that is small (close to 1). The above examples of functions f( ) and g( ) are only for illustration. The values of these functions may be either calculated on-the-fly or pre-stored in a table in a memory. The functions f( ) and g( ) may also be given by a table without referring to an analytic rule.

Then, the scaled integer slope may be obtained as Equation 28 below.

[Math 28]

$$\delta x_{block} = 2^c \times Ex \times \text{Table}[|Ey|] \times \text{sign}(Ey) \qquad \text{(Equation 28)}$$

Here, the operation "sign" returns a sign of the operand, and Table [ ] denotes a result of division by |Ey| retrieved from a look-up table in a memory. The distance δx can then be obtained similarly as previously described, that is, by Equation 29 below.

[Math 29]

$$\delta x = (y \cdot \delta x_{block} + 2^{c-1}) >> c \qquad \text{(Equation 29)}$$

In that case, the distance δx is scaled by a factor $2^a$. The values of the weights and a predictive pixel value of the pixel to be predicted can be deduced from the previous equations by replacing p by a. Another possibility is to keep the distance δx scaled by a factor $2^{c+a}$. In that case, the final prediction must be shifted to the right in order to divide the value by $2^{c+a}$. In other words, these processes can be expressed by Equations 30 to 33.

[Math 30]

$$\delta x = y \cdot \delta x_{block} \qquad \text{(Equation 30)}$$

[Math 31]

$$w_2 = \delta x \,\&\, (2^{c+a}-1) \quad \text{(Equation 31)}$$

[Math 32]

$$w_1 = 2^{c+a} - w_2 \quad \text{(Equation 32)}$$

[Math 33]

$$p(x,y) = (w_3 \cdot p(x-(\delta x >> (c+a)), 0) + w_2 \cdot p(x-((\delta x + 2^{c+a}) >> (c+a)), 0) + 2^{c-1}) >> (c+a) \quad \text{(Equation 33)}$$

In order to limit the memory requirements for storing the division table, preferably only $2^b$ table entries are stored. This means that $|Ey|$ entries only exist for $0 < |Ey| \le 2^b$. In other words, the maximum value of the divisors used for the division indicated in the division table is $2^b$. Preferably, an entry (result of the division) is present in the table for each value of Ey. However, this is not necessary for the present invention and, in general, the table may list an entry only for every second, or third of a value of Ey. If an entry is not present, the closest entry listed in the table is retrieved. However, listing only some entries could result in a loss of accuracy.

If the divisor Ey is larger than the largest divisor listed in the table, then, preferably the values of both edge vector coordinates Ey and Ex are shifted to the right by one bit, corresponding to division by 2. In other words, the processes indicated by Equation 34 are performed.

[Math 34]

$$(|Ey| > 2^b) \begin{cases} Ex = Ex >> 1 \\ Ey = Ey >> 1 \end{cases} \quad \text{(Equation 34)}$$

After the shifting, the result of division is retrieved from the table based on the new value of the divisor Ey. If the result of division is successfully retrieved, the distance $\delta x$ is calculated as shown above. If the value of Ey is still too high, the shifting is repeated until a result of division may be obtained. With this reduction of the number of table entries, the resolution of the edge direction is slightly decreased. However, advantageously, the memory requirements are limited. By setting the parameter b, a tradeoff between the edge direction resolution and memory requirements may be set appropriately for the given computing environment as well as for the size of the block to be interpolated.

The above example has been described for the edge 430 entering from the top side the block to be predicted.

FIG. 4C illustrates another example in which an edge 483 enters the block to be predicted from the left side. In this example, the calculation of a slope is also based on the determined gradients, however, the X and Y coordinates (and correspondingly, the Ex and Ey coordinates) are exchanged as indicated by Equations 35 and 36.

[Math 35]

$$k_1 = \frac{Ey}{Ex} = \frac{\delta y_1}{x} \quad \text{(Equation 35)}$$

[Math 36]

$$\delta y_1 = \frac{x \cdot Ey}{Ex} \quad \text{(Equation 36)}$$

Consequently, the specific computations of the distance $\delta y_1$ will be similar to those of $\delta x$ in the previous example, however, the divisor now is Ex rather than Ey and instead of the vertical coordinate Y of the current pixel, the horizontal coordinate X of the current pixel p(x, y) is used. Moreover, the distance $\delta y_1$ shall be the same for a column rather than for a row of pixels of a neighboring block (adjacent block) adjacent to the current block to be predicted. The present invention and Embodiments may be applied to this example in a corresponding way.

FIG. 4D illustrates another example of a possible edge direction. The edge intersects the left boundary of the block to be predicted. However, unlike the example described with reference to FIG. 4C, the edge 482 cutting the left block boundary continues through the block and cuts a bottom boundary of the top right neighboring block (arrow 481 in FIG. 4D). In that case, the prediction is an interpolation of the edge from two directions. If the present invention is applied to intra-prediction in a system with raster scan of blocks for coding/decoding, the top right neighbor of the block to be interpolated is already coded/decoded and thus, its pixels may also be utilized for the prediction. In the previous examples, the prediction was performed by weighting two pixels in the full-pel positions surrounding the intersection. However, the prediction may also be performed by weighting four pixels: two pixels surrounding the intersection of the left block boundary and two pixels surrounding the intersection of the top right boundary. The weighting factors may further consider the distance of the particular intersection from the pixel to be predicted.

For simplicity, all the above examples have been described for a block of 4×4 pixels. However, the present invention is not limited to such blocks. In general, any other square and rectangular sizes of blocks such as 8×8, 16×16, 8×16, 4×8, etc. may be interpolated as described above.

Moreover, the above examples have been described mainly for deployment in image or video encoders and decoders. However, the present invention is not limited thereto. The present invention may readily be applied for other image processing tasks in which spatial extrapolation or interpolation is required. For instance, the extrapolation/interpolation according to the present invention may be used for post-processing such as error concealment.

Figure 5:
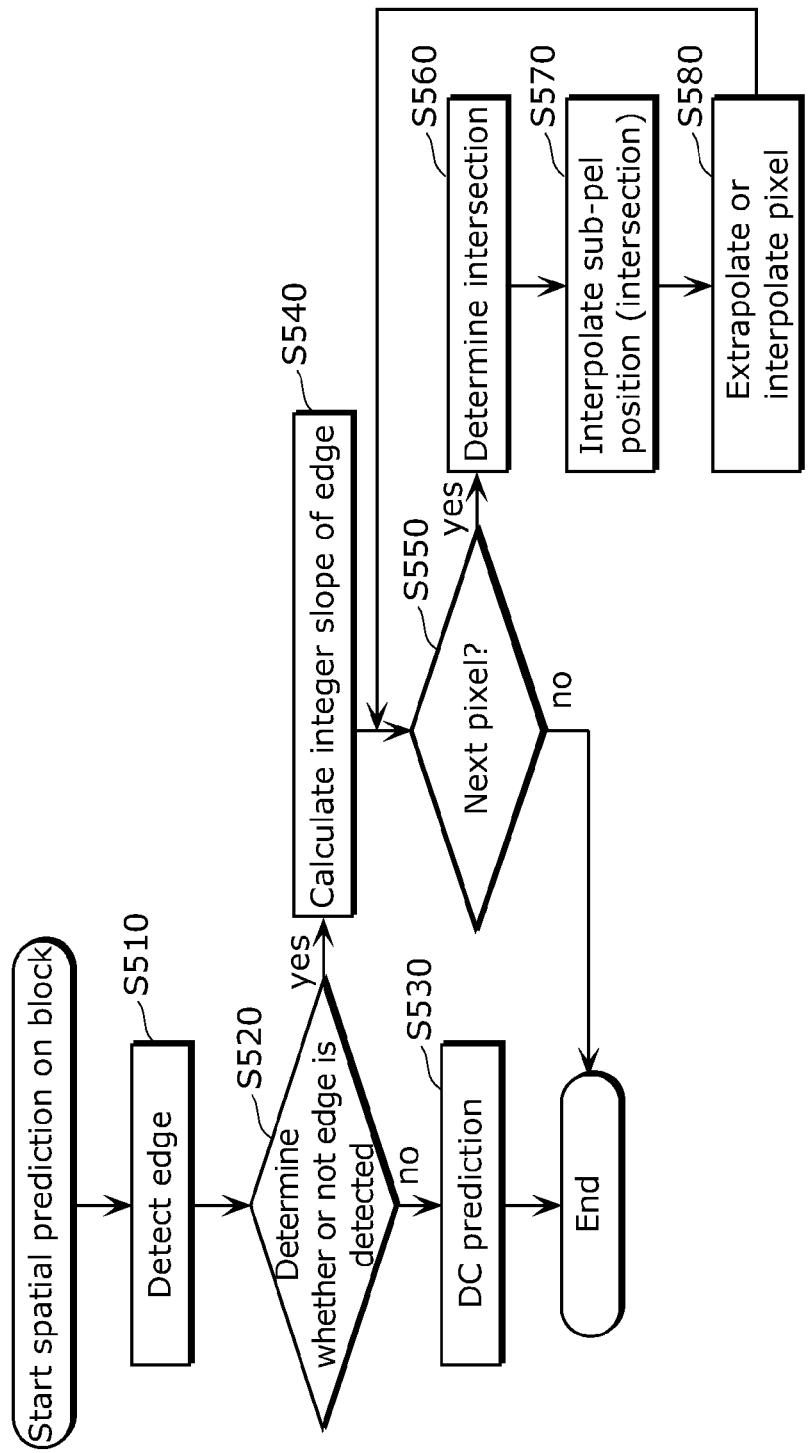
FIG. 5 is a flowchart indicating processes performed by the intra prediction unit according to Embodiment 1.

FIG. 5 summarizes the spatial prediction of a block of pixels (block) according to the present invention employed in video coding/decoding for intra prediction. First, each of the intra prediction units 170 and 270 detects an edge (Step S510), and determines whether or not the edge is detected (Step S520). In other words, a dominant edge along which the extrapolation or interpolation is to be performed is detected. If there is no edge detected ("no" in Step 520), meaning that the neighborhood of the block to be predicted is substantially smooth, each of the intra prediction units 170 and 270 applies a so-called DC interpolation (prediction using a DC prediction mode) to the block to be predicted (Step S530). The DC interpolation sets all pixels of the block to be predicted to the same value given by the average value of the adjacent pixels. If, on the other hand, an edge is detected ("yes" in Step 520), each of the intra prediction units 170 and 270 calculates the integer slope of the edge (Step S540).

Then, each of the intra prediction units 170 and 270 determines whether or not the current pixel to be predicted (next pixel) is present (Step S550). When determining the presence, it determines the intersection of the edge with the block boundaries (Step S560). Furthermore, each of the intra prediction units 170 and 270 interpolates the intersecting sub-pel position(s) (pixel value of the sub-pixel) if necessary (Step S570), and accordingly extrapolates or interpolates the pixel in the current pixel to be predicted, using the pixel value of the sub-pixel (Step S580). When determining no current pixel to be predicted ("no" in Step S550), each of the intra prediction units 170 and 270 ends the spatial prediction for the current block.

As illustrated in FIGS. 2 and 3, the intra prediction unit 170 in the encoder 100 and the intra prediction unit 270 in the decoder 200 perform the spatial prediction according to Embodiment 1. In particular, the intra prediction unit 170 or 270 may further include an edge detection unit (detection unit), an intersection determining unit (determining unit), an interpolating unit that interpolates the sub-pel positions in neighboring blocks, and an extrapolating/interpolating unit (prediction unit). The edge detection unit detects a dominant edge cutting the block to be predicted. The intersection determining unit determines the sub-pel position corresponding to the intersection of the edge determined by the edge detection unit, and the row or column of pixels belonging to neighboring blocks surrounding the block to be predicted. The interpolating unit interpolates the pixel value of the sub-pel position calculated by the intersection determining unit based on the value of the closest full pel. The extrapolating/interpolating unit extrapolates/interpolates the pixel value of the current pixel (pixel within the current block to be predicted) based on the sub-pel position(s) calculated by the intersection determining unit.

In the above examples, an image is coded and/or decoded in a raster scan of blocks. The adjacent blocks available for prediction are always the blocks on the top of the block to be predicted and the blocks left from the block to be predicted. However, the present invention will also work for different scans as long as there is at least one block already coded/decoded adjacent to the block to be predicted or as long as there is an edge cutting the block to be predicted and passing the adjacent block.

The above examples have been described for a single block of pixels. Indeed, an image subdivided into a plurality of blocks may be coded using different coding methods for each of the blocks. Error concealment may also be applied to single blocks. However, the present invention may also be applied to code an entire image or frame of a video sequence.

Figure 6:
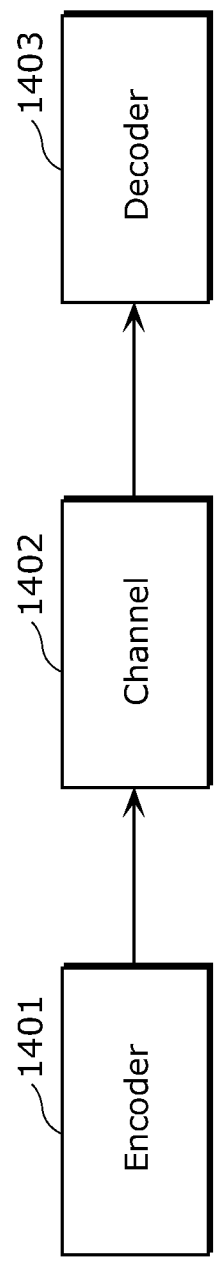
FIG. 6 is an example of a system according to Embodiment 1.

FIG. 6 illustrates an example system for transferring a bitstream including a coded video image from an encoder to a decoder in accordance with the present invention. The system includes an encoder 1401, a channel 1402, and a decoder 1403. The encoder 1401 corresponds to the encoder 100, and the decoder 1403 corresponds to the decoder 200.

The encoder (transmitter) 1401 codes an input video signal, and transmits the resulting signal to the channel 1402. The encoder 1401 performs coding including the directional spatial prediction in accordance with any of Embodiments of the present invention for intra prediction of at least one block as described above. The channel 1402 is either a storage or any transmission channel. The storage may be, for instance, any volatile or non-volatile memory, any magnetic or optical medium, a mass-storage, etc. The transmission channel may be formed by physical resources of any transmission system, wireless or wired, fixed or mobile, such as xDSL, ISDN, WLAN, GPRS, UMTS, Internet, or any standardized or proprietary system.

The encoder 1401 may perform format conversion on the input video signal, and include a transmitter for transferring a bitstream over the channel 1402. Furthermore, the encoder 1401 may include an application for transferring a bitstream to the storage.

The bitstream is then obtained by the decoder (receiver) 1403 through the channel 1402. The decoder 1403 implements the directional spatial prediction in accordance with Embodiment 1 of the present invention as described above, and decodes the bitstream.

The decoder 1403 may include a receiver for receiving the bitstream through the channel 1402, or an application for extracting the bitstream from the storage. Furthermore, the decoder 1403 may include a post-processing unit for post processing the decoded video signal, such as format conversion.

Summarizing, the present invention relates to an efficient implementation of directional spatial prediction. The directional spatial prediction includes detecting an edge by means of determining a vertical gradient and a horizontal gradient within an adjacent block, determining for each pixel to be predicted an intersection of the detected edge with a row or a column of pixels of the adjacent block, and extrapolating or interpolating each pixel (pixel to be predicted) in the block according to the determined intersection. The intersection may be a sub-pel position. In particular, the calculation of the intersection includes dividing by a vertical gradient or a horizontal gradient to obtain an integer slope common for the entire block to be predicted. This reduces the number of divisions to one per block. In order to increase the precision of the division, a scaling by a scaling factor depending on a value of a horizontal gradient or a vertical gradient may be applied. In other words, processes of the spatial prediction method according to the present invention are performed as indicated in FIG. 7.

Figure 7:
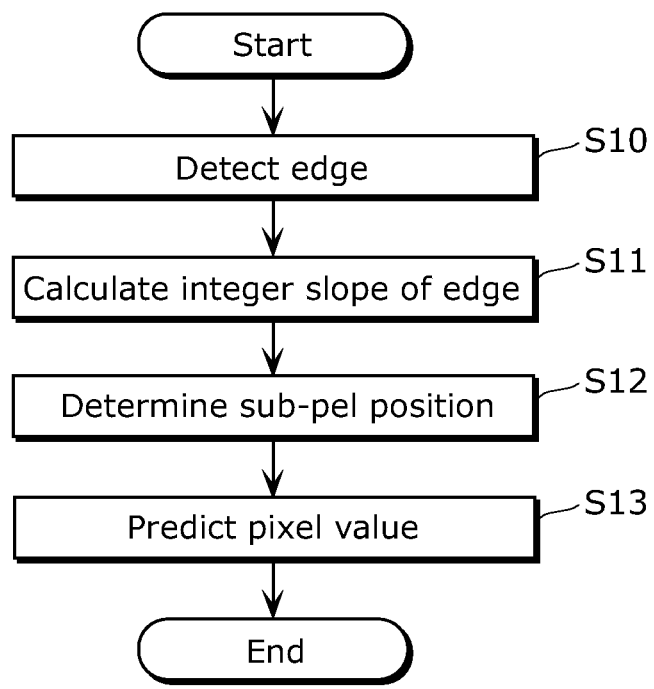
FIG. 7 is a flowchart indicating a spatial prediction method according to an aspect of the present invention.

FIG. 7 indicates the spatial prediction method according to an aspect of the present invention.

The spatial prediction method is a method for spatially predicting a pixel value at each pixel position within a current block included in an image. First, the intra prediction unit 170 detects an edge E that overlaps the current block by obtaining the horizontal gradient Gy and the vertical gradient Gx between pixels within the adjacent block adjacent to the current block (Step S10). Next, the intra prediction unit 170 calculates an integer slope indicating an integer value of a slope of the detected edge, based on at least one of the obtained horizontal gradient Gy and the vertical gradient Gx (Step S11). Next, the intra prediction unit 170 determines, for each of the pixel positions within the current block, the sub-pel 450 that is an intersection between (i) a line 430 that has the calculated integer slope and passes through the pixel position 440 and (ii) a boundary of the adjacent block (Step S12). Next, the intra prediction unit 170 predicts (extrapolates or interpolates), for each of the pixel positions, a pixel value at the pixel position 440, based on a value interpolated in the sub-pel position 450 determined for the pixel position 440 (Step S13). Here, the boundary of the adjacent block is a row or a column that is the closest to the current block, among a plurality of rows or a plurality of columns of pixels included in the adjacent block. The intra prediction unit 270 also performs such processes.

The integer slope has only to be calculated based on at least one of the horizontal gradient Gy and the vertical gradient Gx, and the two gradients do not necessarily have to be used for the calculation.

Furthermore, although the image coding apparatus 100 includes the motion compensated prediction unit 160 and others as the constituent elements other than the intra prediction unit 170, it has only to include at least the subtracting unit 105 and the intra prediction unit 170, and does not have to include the other constituent elements.

Furthermore, although the image decoding apparatus 200 includes the motion compensated prediction unit 260 and others as the constituent elements other than the intra prediction unit 270, it has only to include at least the adding unit 225 and the intra prediction unit 270, and does not have to include the other constituent elements.

According to Embodiment 1, the image coding apparatus 100 entropy-codes the intra-prediction mode information, and outputs the entropy-coded intra-prediction mode information, and the image decoding apparatus 200 entropy-decodes the intra-prediction mode information. Here, the intra-prediction mode information may be information indicating the directional intra-prediction modes, and may be information indicating that only intra prediction is applied to the current block to be coded or decoded, without indicating the directional intra-prediction modes.

Embodiment 2

An independent computer system can easily perform processing described in each of Embodiments by recording, in a recording medium, a program for implementing the structure of the video coding method (image coding method) or the video decoding method (image decoding method) according to Embodiment 1. The recording medium may be any as long as the program can be recorded therein, such as a magnetic disk, an optical disk, an optical magnetic disk, and a semiconductor memory.

Hereinafter, applications of the video coding method and the video decoding method according to each of Embodiments, and a system using such applications will be described.

Figure 8:
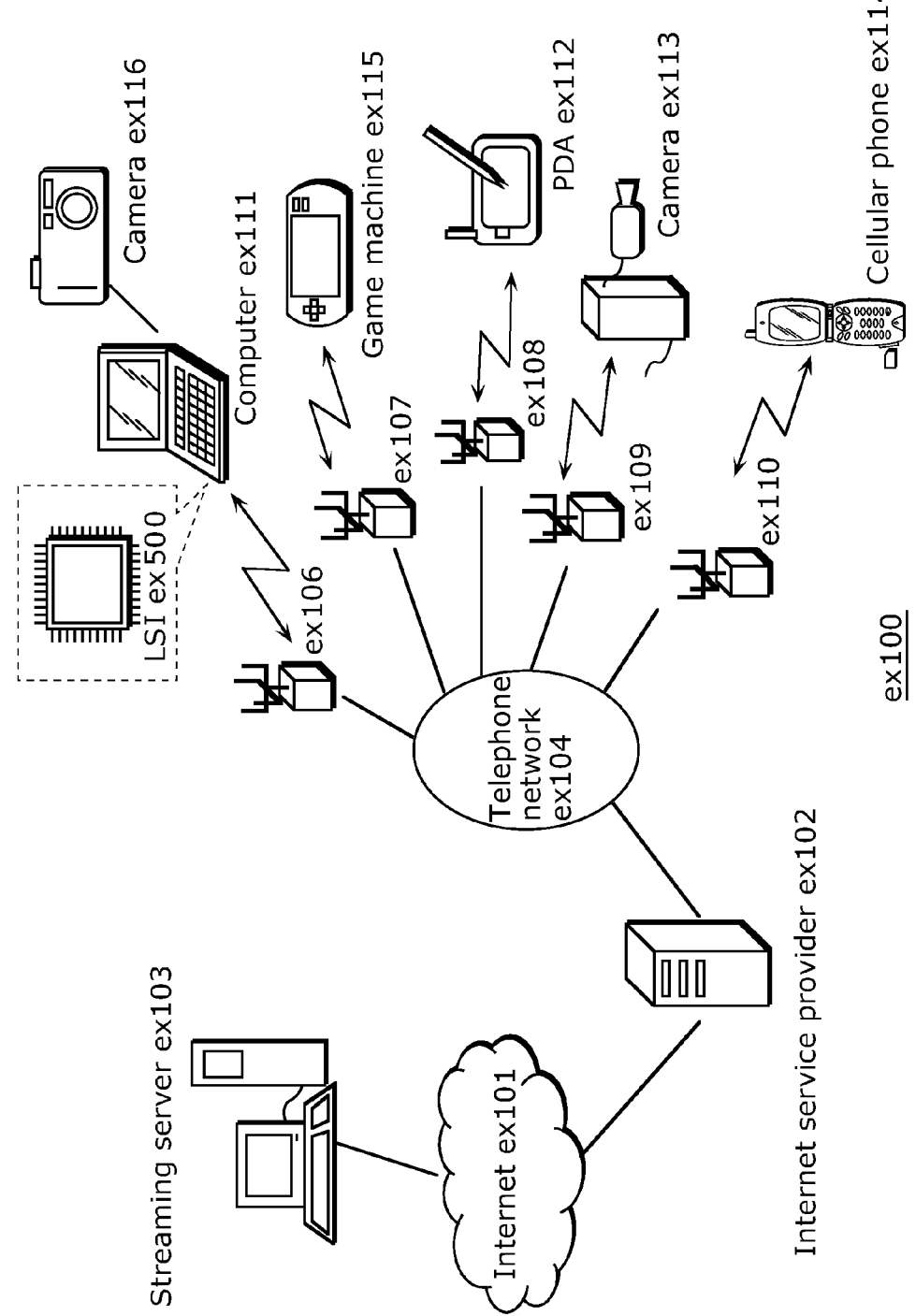
FIG. 8 illustrates an overall configuration of a content providing system for implementing content distribution services.

FIG. 8 illustrates an overall configuration of a content providing system ex100 for implementing content distribution services. The area for providing communication services is divided into cells of desired size, and base stations ex106 to ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via an Internet ex101, an Internet service provider ex102, a telephone network ex104, as well as the base stations ex106 to ex110.

However, the configuration of the content providing system ex100 is not limited to the configuration shown in FIG. 8, and a combination in which any of the elements are connected is acceptable. In addition, each of the devices may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing moving images. A camera ex116, such as a digital video camera, is capable of capturing both still images and moving images. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of a live show and others. For such a distribution, a content (for example, video of a music live show) captured by the user using the camera ex113 is coded as described above in each of Embodiments, and the coded content is transmitted to the streaming server ex103. On the other hand, the streaming server ex103 carries out stream distribution of the received content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and moving images captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, generally, the computer ex111 and an LSI ex500 included in each of the devices perform such coding and decoding processes. The LSI ex500 may be configured of a single chip or a plurality of chips. Software for coding and decoding moving images may be integrated into some type of a recording medium (such as a CD-ROM, a flexible disk, a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients can receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 9:
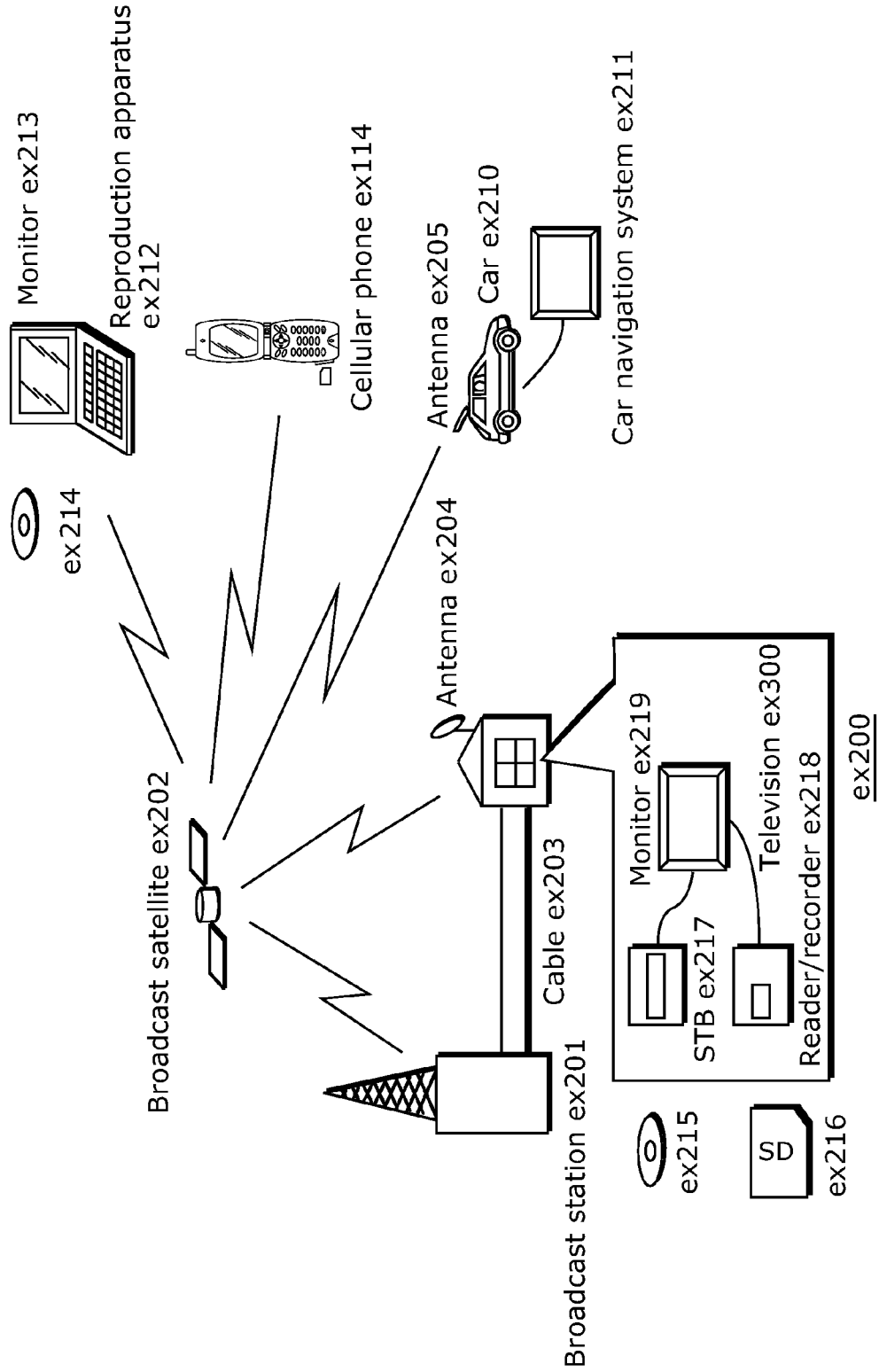
FIG. 9 illustrates an overall configuration of a digital broadcasting system.

The present invention is not limited to the above-mentioned content providing system ex100, and at least either the video coding apparatus or the video decoding apparatus described in each of Embodiments can be incorporated into a digital broadcasting system ex200 as shown in FIG. 9. More specifically, a broadcast station ex201 communicates or transmits, via radio waves to a broadcast satellite ex202, multiplexed data obtained by multiplexing the audio data and the video data. The video data is data coded according to the video coding method described in each of Embodiments. Upon receipt of the video data, the broadcast satellite ex202 transmits radio waves for broadcasting. Then, a home-use antenna ex204 capable of receiving a satellite broadcast receives the radio waves. A device, such as a television (receiver) ex300 and a set top box (STB) ex217, decodes the received multiplexed data and reproduces the data.

Furthermore, a reader/recorder ex218 that (i) reads and decodes the multiplexed data recorded on a recording media ex215, such as a DVD and a BD, or (ii) codes video signals in the recording medium ex215, and in some cases, writes data obtained by multiplexing an audio signal on the coded data can include the video decoding apparatus or the video coding apparatus as shown in each of Embodiments. In this case, the reproduced video signals are displayed on the monitor ex219, and another apparatus or system can reproduce the video signals, using the recording medium ex215 on which the multiplexed data is recorded. Furthermore, it is also possible to implement the video decoding apparatus in the set top box ex217 connected to the cable ex203 for a cable television or the antenna ex204 for satellite and/or terrestrial broadcasting, so as to display the video signals on the monitor ex219 of the television ex300. The video decoding apparatus may be included not in the set top box but in the television ex300.

Figure 10:
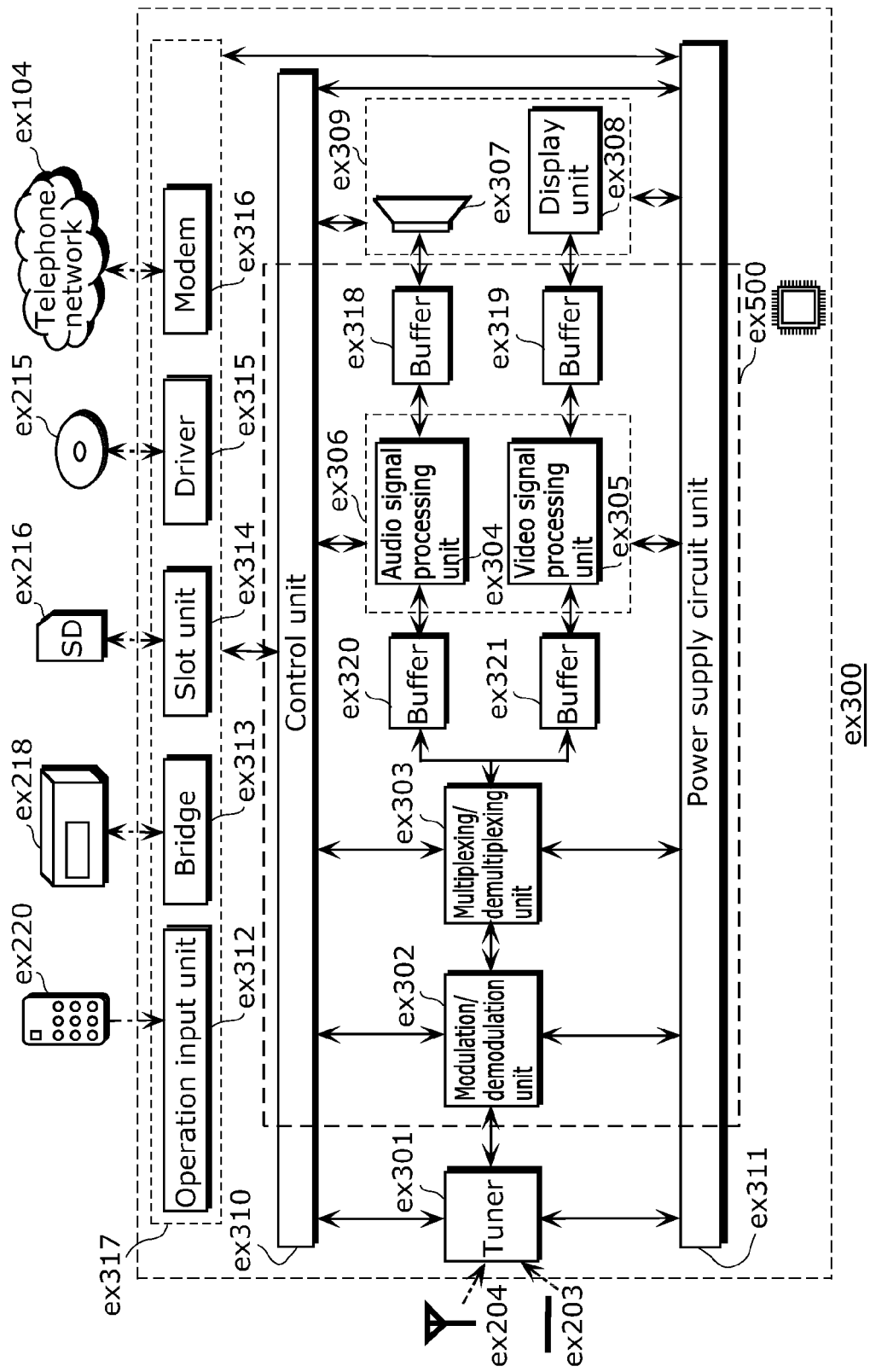
FIG. 10 illustrates a block diagram of an example of a configuration of a television.

FIG. 10 illustrates the television (receiver) ex300 that uses the video coding method and the video decoding method described in each of Embodiments. The television ex300 includes: a tuner ex301 that obtains or provides multiplexed data obtained by multiplexing the audio data and the video data through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes the video data and audio data coded by the signal processing unit ex306 into data. Furthermore, the television ex300 further includes: a signal processing unit ex306 including an audio signal processing unit ex304 and a video signal processing unit ex305 that decode audio data and video data and code audio data and video data, respectively; a speaker ex307 that provides the decoded audio signal; and an output unit ex309 including a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to one another through a synchronous bus.

First, a configuration in which the television ex300 decodes the multiplexed data obtained from outside through the antenna ex204 and others and reproduces the decoded data will be described. In the television ex300, upon receipt of a user operation from a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside. When the output unit ex309 provides the video signal and the audio signal, the signals may be temporarily stored in buffers ex318 and ex319, and others so that the signals are reproduced in synchronization with each other. Furthermore, the television ex300 may read the multiplexed data not through a broadcast and others but from the recording media ex215 and ex216, such as a magnetic disk, an optical disc, and an SD card. Next, a configuration in which the television ex300 codes an audio signal and a video signal, and transmits the data outside or writes the data on a recording medium will be described. In the television ex300, upon receipt of a user operation from the remote controller ex220 and others, the audio signal processing unit ex304 codes an audio signal, and the video signal processing unit ex305 codes a video signal, under control of the control unit ex310 using the coding method as described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in buffers ex320 and ex321, and others so that the signals are reproduced in synchronization with each other. Here, the buffers ex318 to ex321 may be plural as illustrated, or at least one buffer may be shared in the television ex300. Furthermore, data may be stored in a buffer other than the buffers ex318 to ex321 so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be not capable of performing all the processes but capable of only one of receiving, decoding, and providing outside data.

Furthermore, when the reader/recorder ex218 reads or writes the multiplexed data from or in a recording medium, one of the television ex300 and the reader/recorder ex218 may decode or code the multiplexed data, and the television ex300 and the reader/recorder ex218 may share the decoding or coding.

Figure 11:
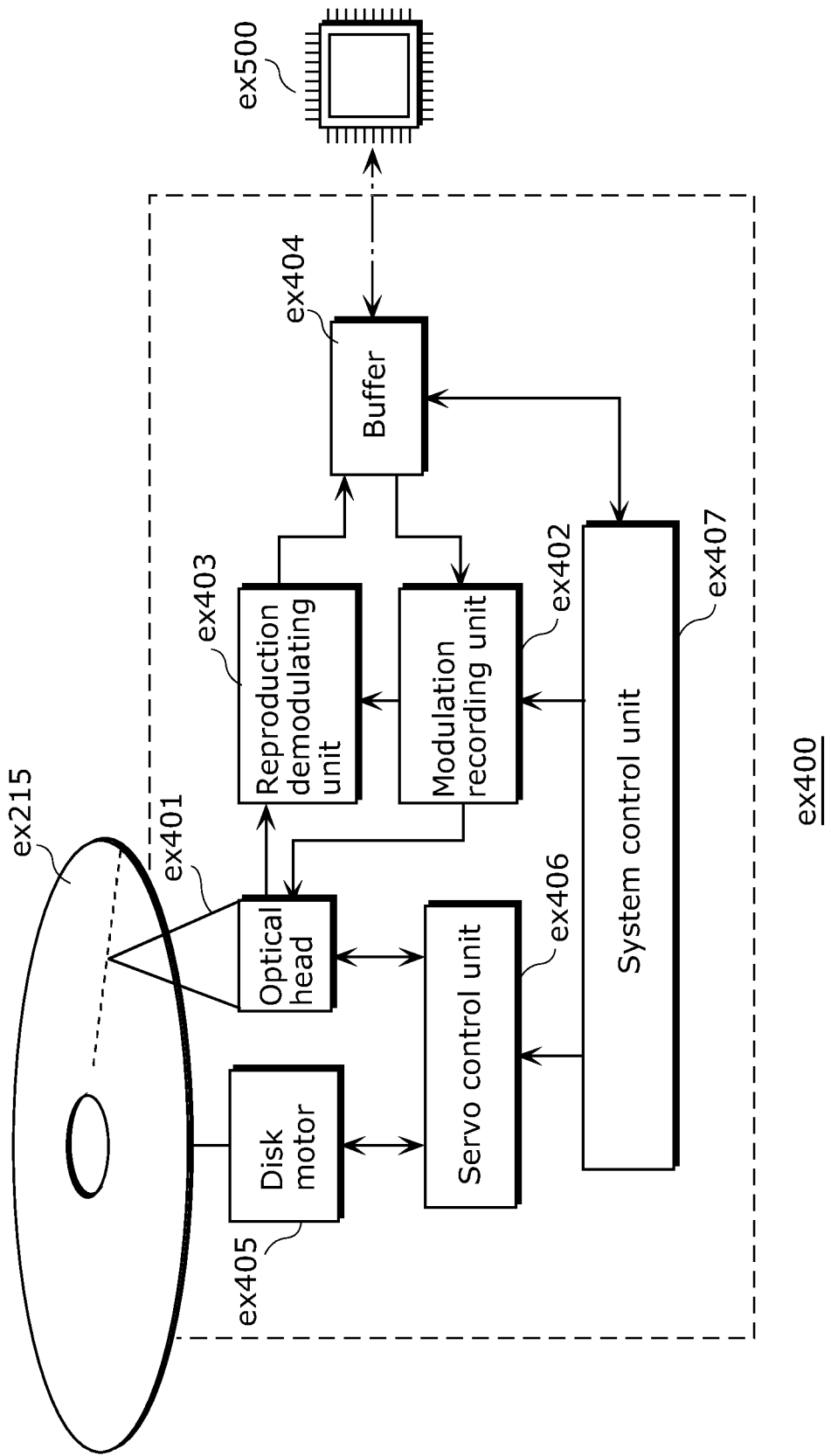
FIG. 11 is a block diagram illustrating an example of a configuration of an information reproducing/recording unit that reads and writes information from or on a recording medium that is an optical disc.

As an example, FIG. 11 illustrates a configuration of an information reproducing/recording unit ex400 when data is read or written from or in an optical disc. The information reproducing/recording unit ex400 includes constituent elements ex401 to ex407 to be described hereinafter. The optical head ex401 irradiates a laser spot on a recording surface of the recording medium ex215 that is an optical disc to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. A disk motor ex405 rotates the recording medium ex215. A servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 12:
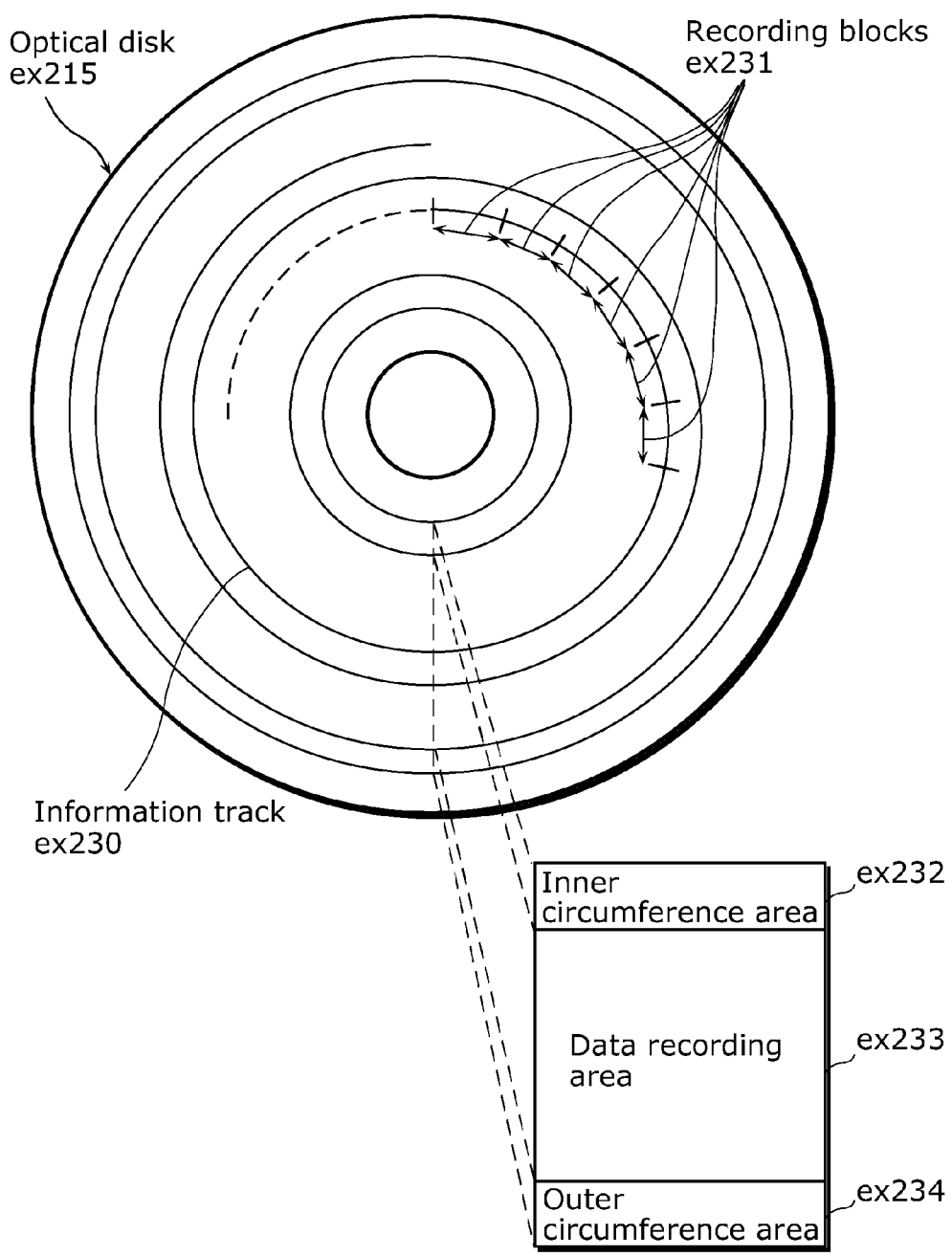
FIG. 12 illustrates an example of a configuration of a recording medium that is an optical disc.

FIG. 12 schematically illustrates the recording medium ex215 that is the optical disc. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. An apparatus that records and reproduces data reproduces the information track ex230 and reads the address information so as to determine the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio data, coded video data, or multiplexed data obtained by multiplexing the coded audio data and the coded video data, from and on the data recording area ex233 of the recording medium ex215.

Although an optical disc having a layer, such as a DVD and a BD is described as an example in the description, the optical disc is not limited to such, and may be an optical disc having a multilayer structure and capable of being recorded on a part other than the surface. Furthermore, the optical disc may have a structure for multidimensional recording/reproduction, such as recording of information using light of colors with different wavelengths in the same portion of the optical disc and recording information having different layers from various angles.

Furthermore, the car ex210 having the antenna ex205 can receive data from the satellite ex202 and others, and reproduce video on the display device such as the car navigation system ex211 set in the car ex210, in a digital broadcasting system ex200. Here, a configuration of the car navigation system ex211 will be the one for example, including a GPS receiving unit in the configuration illustrated in FIG. 10. The same will be true for the configuration of the computer ex111, the cellular phone ex114, and others.

Figure 13A:
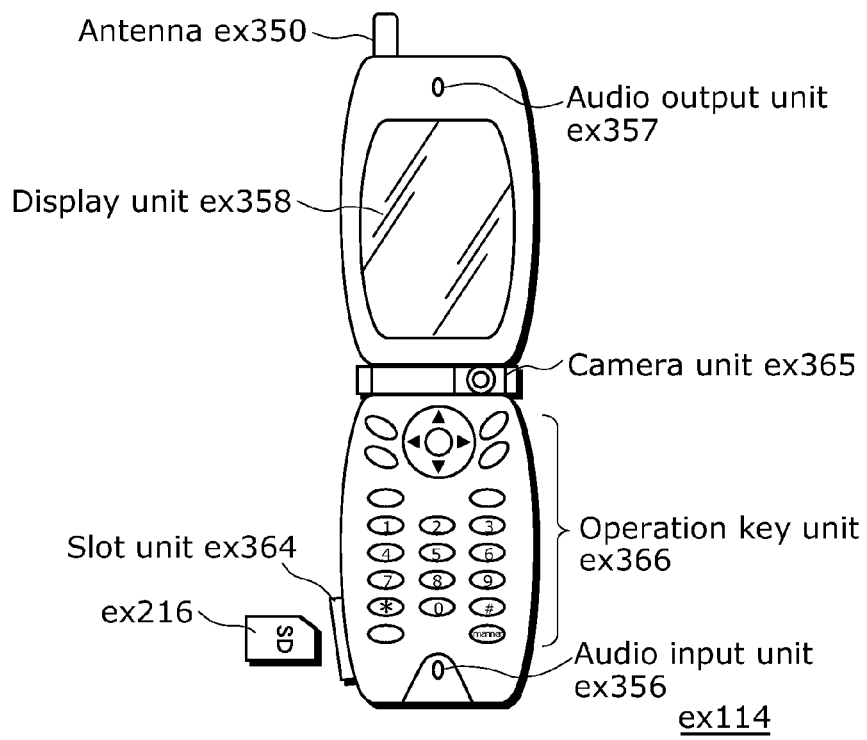
FIG. 13A illustrates an example of a cellular phone.

FIG. 13A illustrates the cellular phone ex114 that uses the video coding method and the video decoding method described in each of Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including a set of operation keys ex366; an audio output unit ex357 such as a speaker for output of audio; an audio input unit ex356 such as a microphone for input of audio; a memory unit ex367 for storing captured video or still pictures, recorded audio, coded or decoded data of the received video, the still images, e-mails, or others; and a slot unit ex364 that is an interface unit for a recording medium that stores data in the same manner as the memory unit ex367.

Figure 13B:
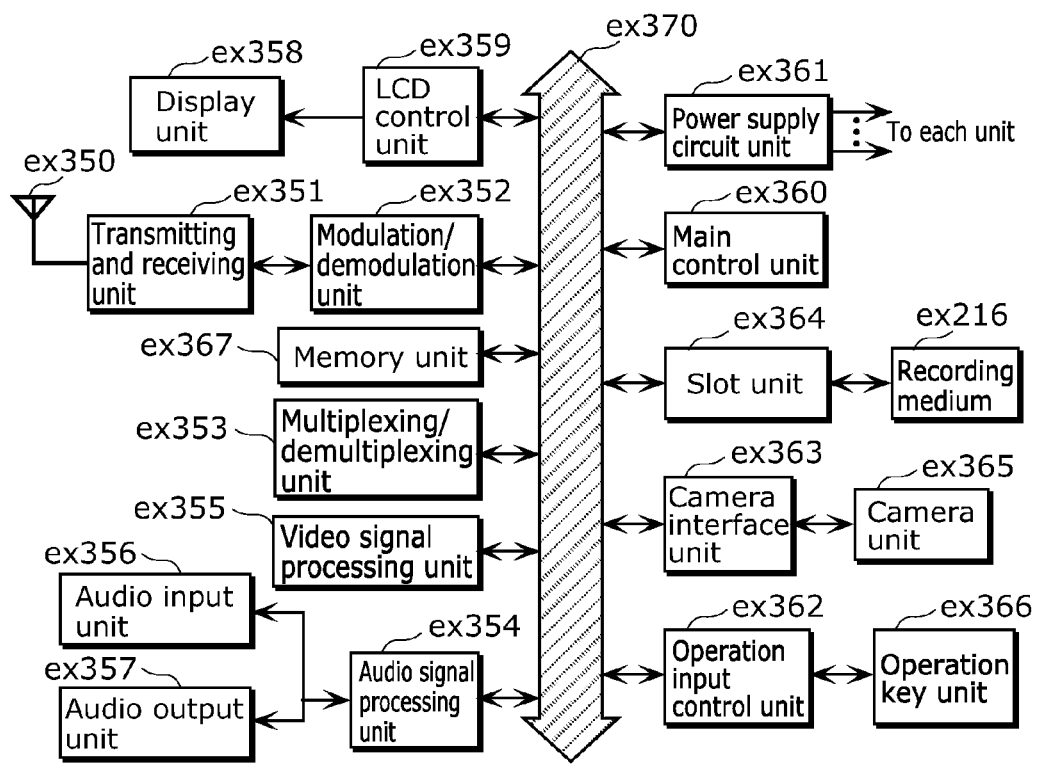
FIG. 13B illustrates a block diagram of an example of a configuration of the cellular phone.

Next, an example of a configuration of the cellular phone ex114 will be described with reference to FIG. 13B. In the cellular phone ex114, a main control unit ex360 designed to control overall each unit of the main body including the display unit ex358 as well as the operation keys ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex356.

Furthermore, when an e-mail in data communication mode is transmitted, text data of the e-mail inputted by operating the operation keys ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving image coding method shown in each of Embodiments, and transmits the coded video data to the multiplexing/demultiplexing unit ex353. In contrast, during the time when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a video decoding method corresponding to the video coding method shown in each of Embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the video coding method and the video decoding method in each of Embodiments can be used in any of the devices and systems described. Thus, the advantages described in each of Embodiments can be obtained.

Furthermore, the present invention is not limited to Embodiments, and various modifications and revisions are possible without departing from the scope of the present invention.

Embodiment 3

Video data can be generated by switching, as necessary, between (i) the moving image coding method or the moving image coding apparatus shown in each of Embodiments and (ii) a moving image coding method or a moving image coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving image coding method and by the moving image coding apparatus shown in each of Embodiments will be hereinafter described. The multiplexed data is a digital stream in the MPEG-2 Transport Stream format.

FIG. 14 illustrates a structure of multiplexed data. As illustrated in FIG. 14, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of a movie. Here, the primary video is normal video to be displayed on a screen, and the secondary video is video to be displayed on a smaller window in the main video. Furthermore, the interactive graphics stream represents an interactive screen to be generated by arranging the GUI components on a screen. The video stream is coded in the video coding method or by the video coding apparatus shown in each of Embodiments, or in a video coding method or by a video coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 15:
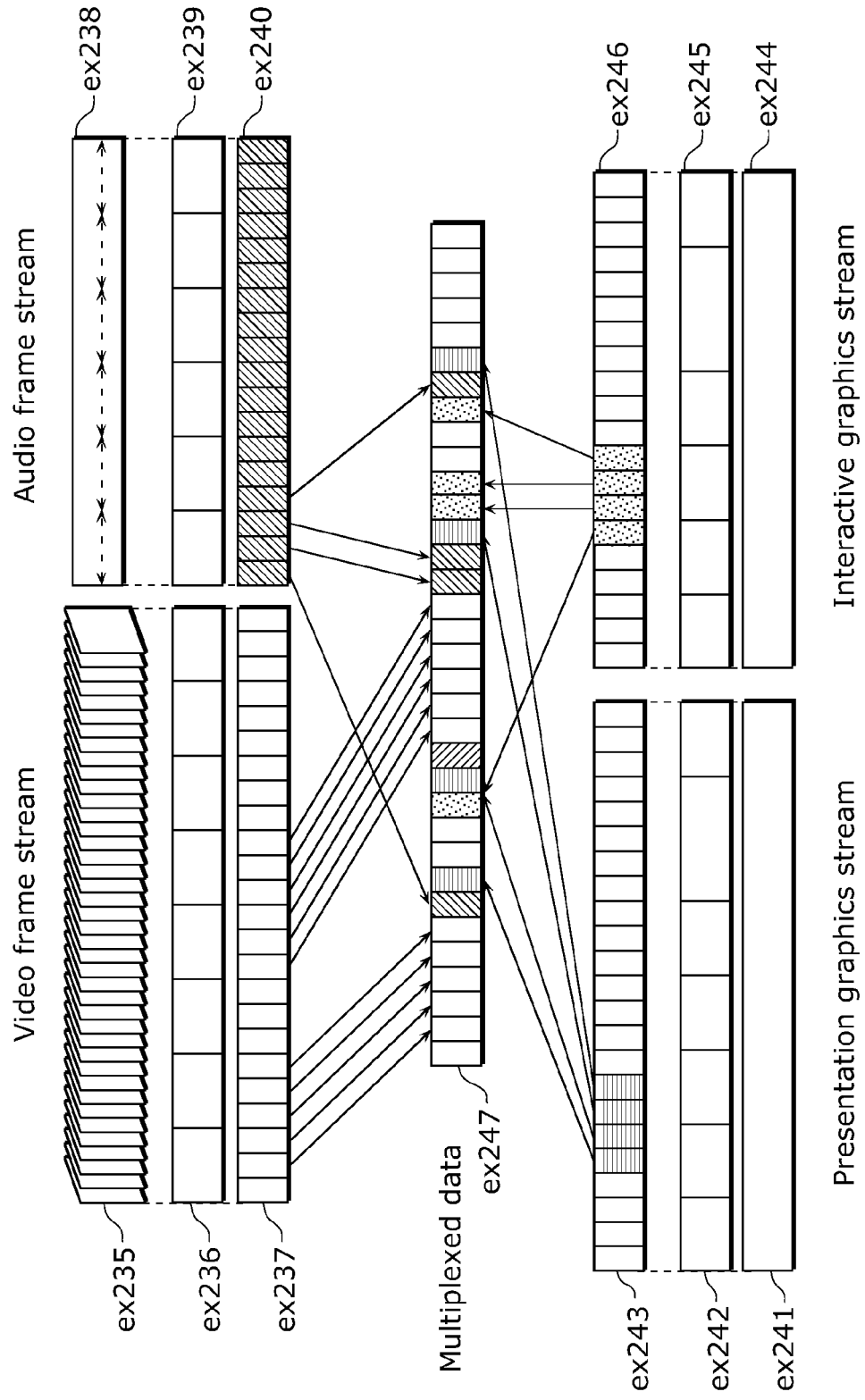
FIG. 15 schematically illustrates how each stream is multiplexed in multiplexed data.

FIG. 15 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 16:
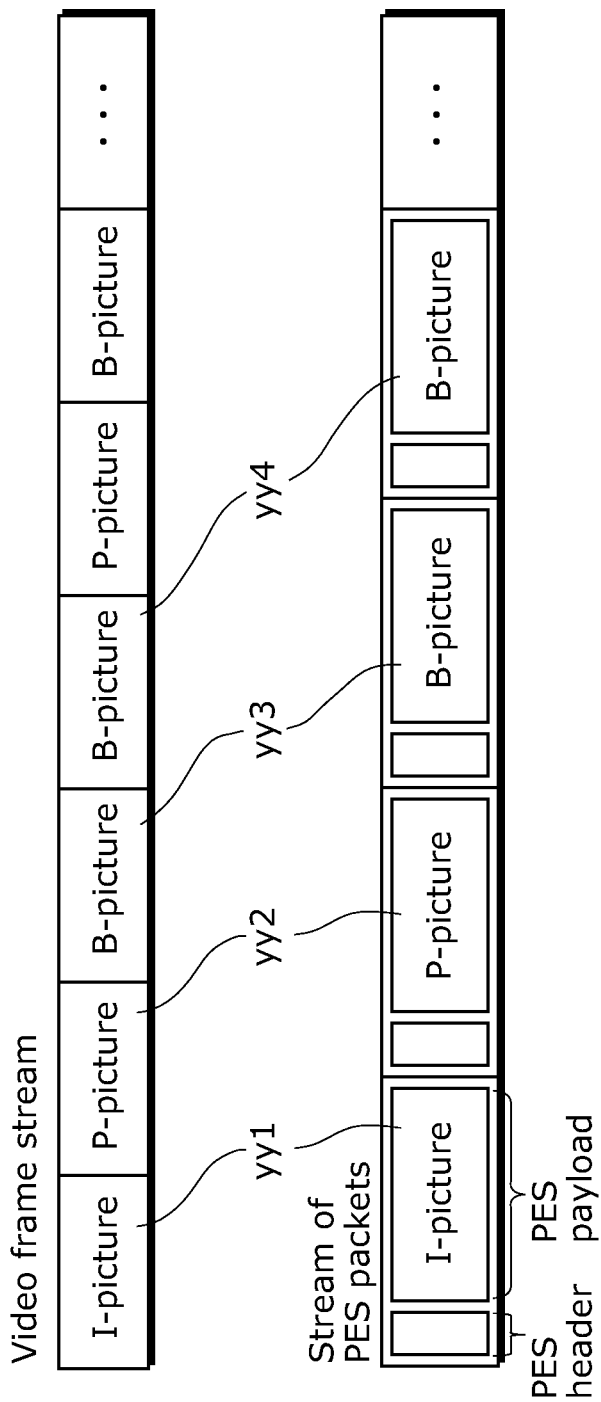
FIG. 16 illustrates how a video stream is stored in a stream of PES packets in more detail.

FIG. 16 illustrates how a video stream is stored in a stream of PES packets in more detail. The first bar in FIG. 16 shows a video frame stream in a video stream. The second bar shows the stream of PES packets. As indicated by arrows denoted as yy1, yy2, yy3, and yy4 in FIG. 16, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 17 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival- _Time_Stamp (ATS). The ATS shows a transfer start time at which each of the TS packets is to be transferred to a PID filter. The numbers incrementing from the head of the multiplexed data are called source packet numbers (SPNs) as shown at the bottom of FIG. 17.

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 18 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 19:
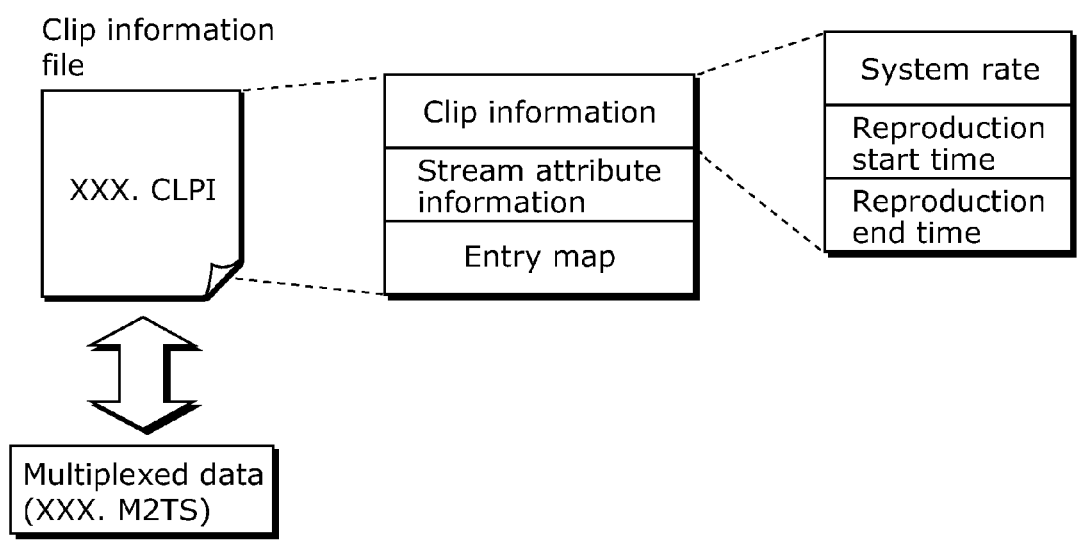
FIG. 19 illustrates an internal structure of multiplexed data information.

Each of the multiplexed data information files is management information of the multiplexed data as shown in FIG. 19. The multiplexed data information files are in one to one correspondence with the multiplexed data, and each of the files includes multiplexed data information, stream attribute information, and an entry map.

As illustrated in FIG. 19, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 20:
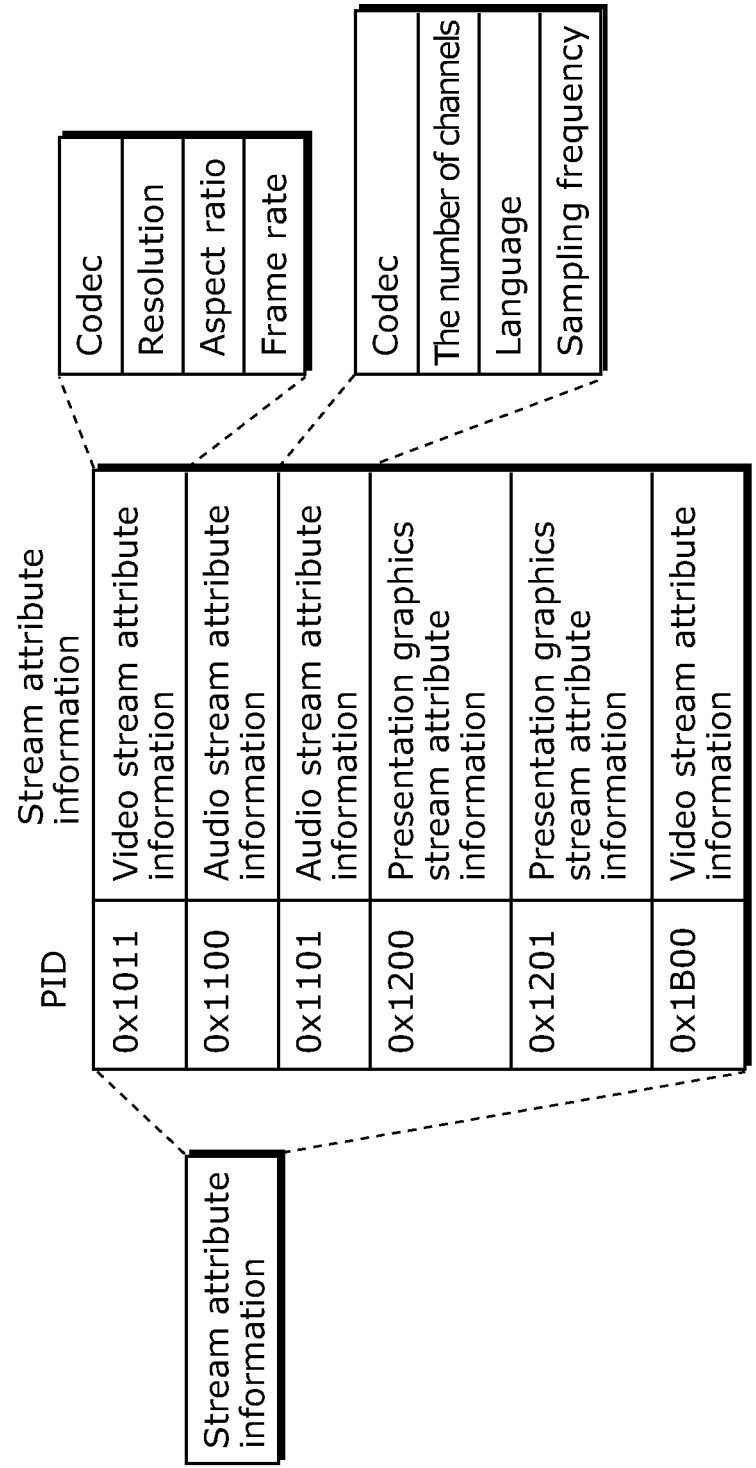
FIG. 20 illustrates an internal structure of stream attribute information.

As shown in FIG. 20, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In Embodiment 3, the multiplexed data to be used is of a stream type included in the PMT. Furthermore, when the multiplexed data is recorded on a recording medium, the video stream attribute information included in the multiplexed data information is used. More specifically, the video coding method or the video coding apparatus described in each of Embodiments includes a step or a unit for allocating unique information indicating video data generated by the video coding method or the video coding apparatus in each of Embodiments, to the stream type included in the PMT or the video stream attribute information. With the structure, the video data generated by the video coding method or the video coding apparatus described in each of Embodiments can be distinguished from video data that conforms to another standard.

Figure 21:
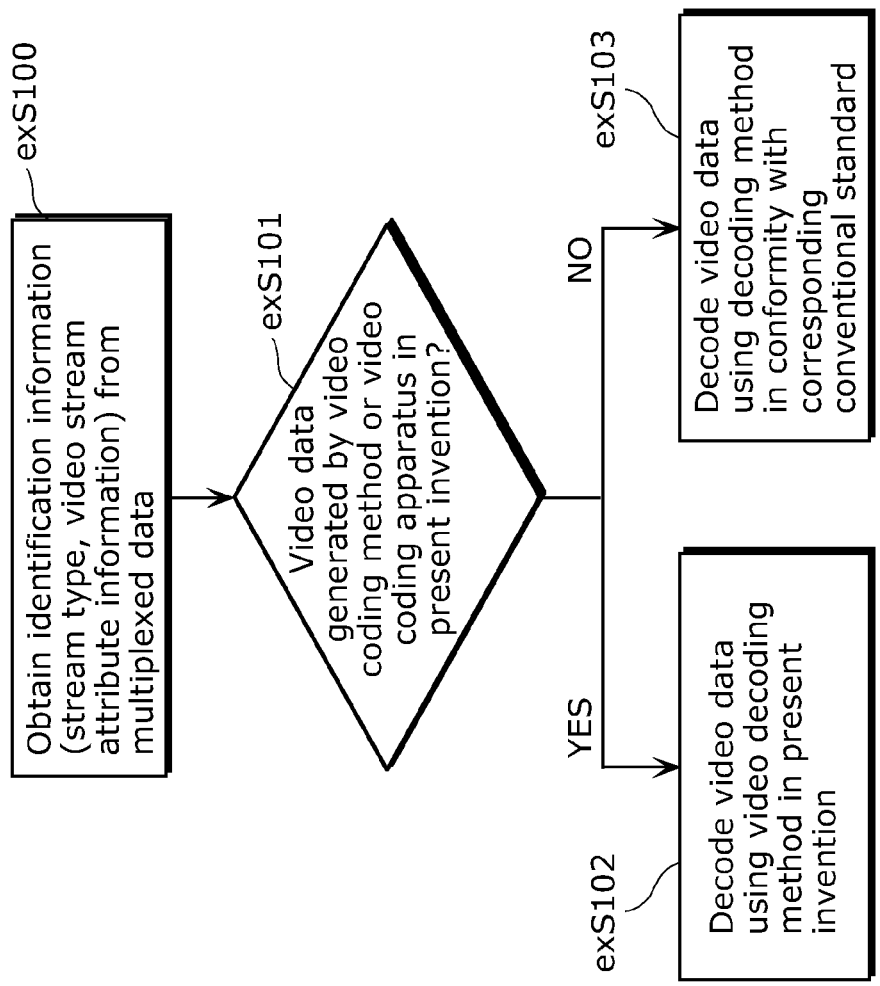
FIG. 21 illustrates steps for identifying video data.

Furthermore, FIG. 21 illustrates steps of the video decoding method according to Embodiment 3. In Step exS100, the stream type included in the PMT or the video stream attribute information is obtained from the multiplexed data. Next, in Step exS101, it is determined whether or not the stream type or the video stream attribute information indicates that the multiplexed data is generated by the video coding method or the video coding apparatus in each of Embodiments. When it is determined that the stream type or the video stream attribute information indicates that the multiplexed data is generated by the video coding method or the video coding apparatus in each of Embodiments, in Step exS102, the stream type or the video stream attribute information is decoded by the video decoding method in each of Embodiments. Furthermore, when the stream type or the video stream attribute information indicates conformance to the conventional standards, such as MPEG-2, MPEG4-AVC, and VC-1, in Step exS103, the stream type or the video stream attribute information is decoded by a video decoding method in conformity with the conventional standards.

As such, allocating a new unique value to the stream type or the video stream attribute information enables determination whether or not the video decoding method or the video decoding apparatus that is described in each of Embodiments can perform decoding. Even upon an input of multiplexed data that conforms to a different standard, an appropriate decoding method or apparatus can be selected. Thus, it becomes possible to decode information without any error. Furthermore, the video coding method or apparatus, or the video decoding method or apparatus in Embodiment 3 can be used in the devices and systems described above.

Embodiment 4

Figure 22:
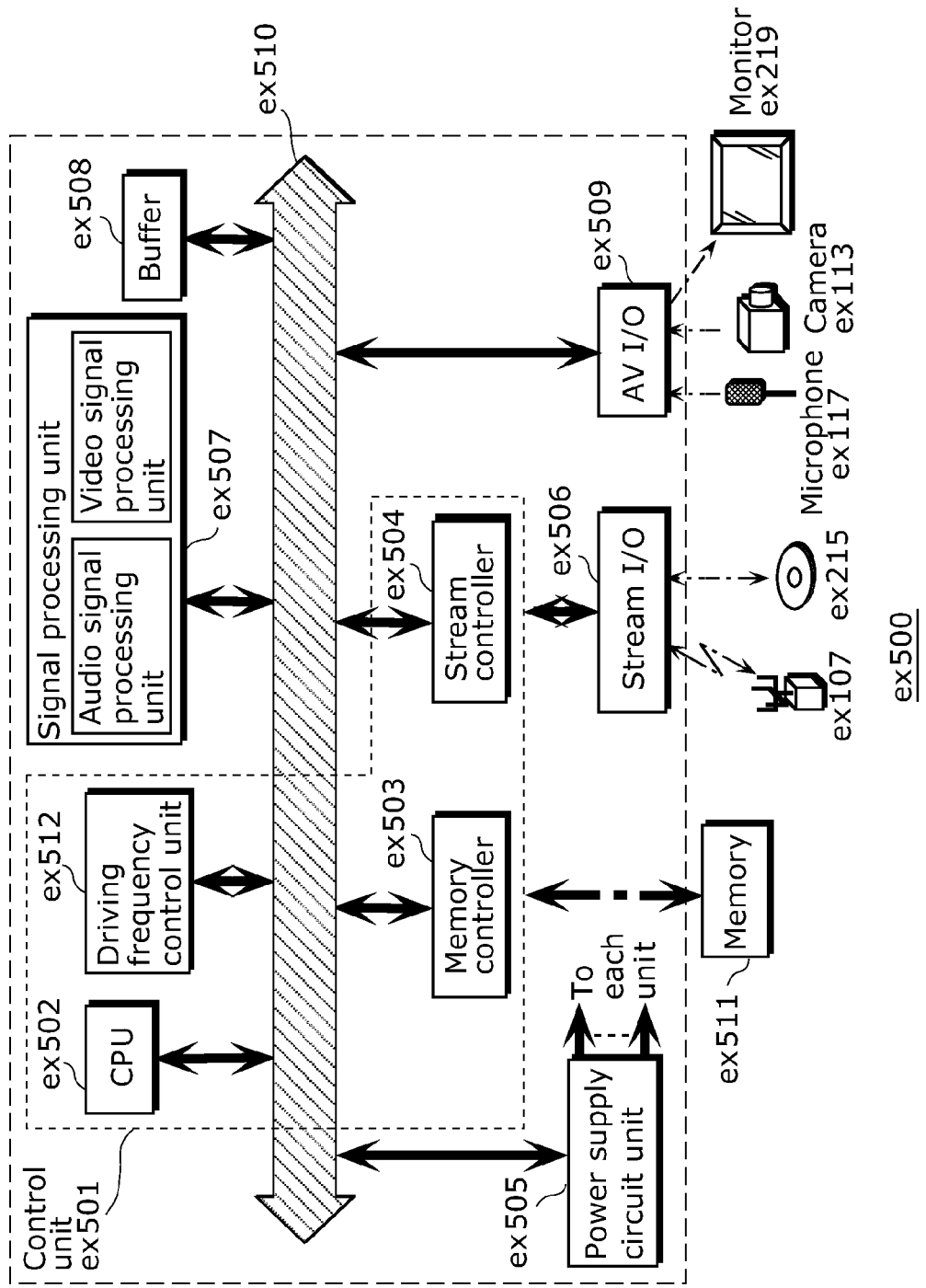
FIG. 22 illustrates a block diagram illustrating an example of a configuration of an integrated circuit for implementing the video coding method and the video decoding method according to each of Embodiments.

Each of the video coding method, the video coding apparatus, the video decoding method, and the video decoding apparatus in each of Embodiments is typically achieved in the form of an integrated circuit or a Large Scale Integrated (LSI) circuit. As an example of the LSI, FIG. 22 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data sets should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex510 includes the CPU ex502, the memory controller ex503, the stream controller ex504, the driving frequency control unit ex512, the configuration of the control unit ex510 is not limited to such. For example, the signal processing unit ex507 may further include a CPU. Inclusion of another CPU in the signal processing unit ex507 can improve the processing speed. Furthermore, as another example, the CPU ex502 may include the signal processing unit ex507, or an audio signal processing unit that is a part of the signal processing unit ex507. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 5

When video data is decoded by the video coding method or by the video coding apparatus described in each of Embodiments, compared to when video data that conforms to a conventional standard, such as MPEG-2, MPEG4-AVC, and VC-1, the computing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 23:
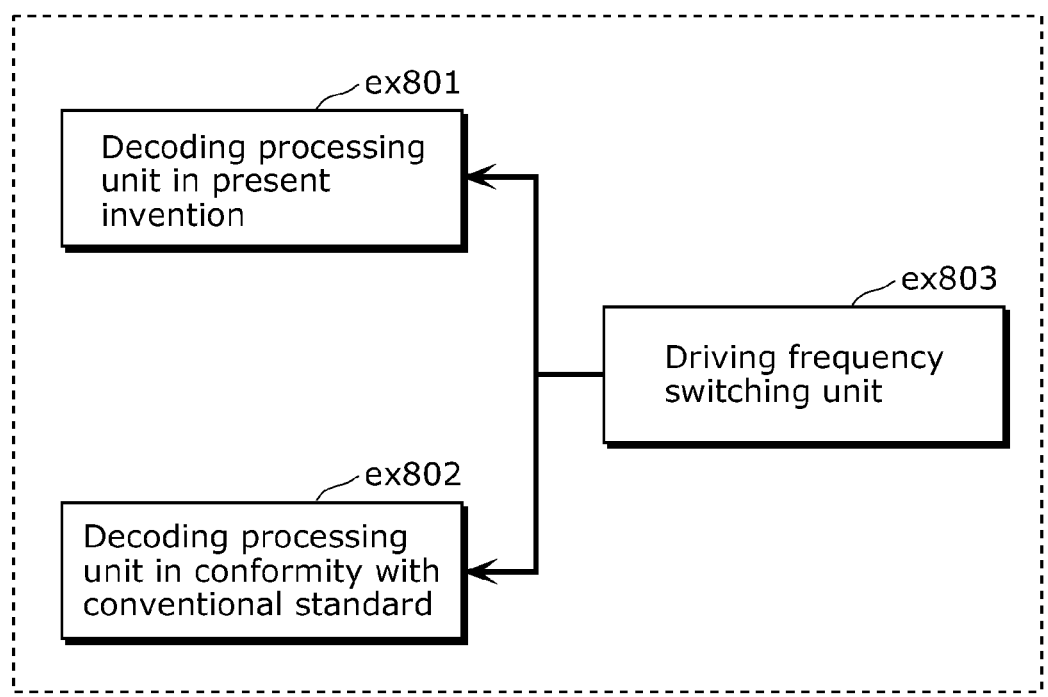
FIG. 23 illustrates a configuration for switching between driving frequencies.

In order to solve the problem, the video decoding apparatus, such as the television ex300 and the LSI ex500 is configured to determine to which standard the video data conforms, and switch between the driving frequencies according to the determined standard. FIG. 23 illustrates a configuration ex800 in Embodiment 5. A driving frequency switching unit ex803 sets a driving frequency to a higher driving frequency when video data is generated by the video coding method or the video coding apparatus described in each of Embodiments. Then, the driving frequency switching unit ex803 instructs a decoding processing unit ex801 that executes the video decoding method described in each of Embodiments to decode the video data. When the video data conforms to the conventional standard, the driving frequency switching unit ex803 sets a driving frequency to a lower driving frequency than that of the video data generated by the video coding method or the video coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 22. Here, each of the decoding processing unit ex801 that executes the video decoding method described in each of Embodiments and the decoding processing unit ex802 that conforms to the conventional standard corresponds to the signal processing unit ex507 in FIG. 22. The CPU ex502 determines to which standard the video data conforms. Then, the driving frequency control unit ex512 determines a driving frequency based on a signal from the CPU ex502. Furthermore, the signal processing unit ex507 decodes the video data based on a signal from the CPU ex502. For example, the identification information described in Embodiment 3 is probably used for identifying the video data. The identification information is not limited to the one described in Embodiment 3 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 25. The driving frequency can be selected by storing the look-up table in the buffer ex508 and an internal memory of an LSI and with reference to the look-up table by the CPU ex502.

Figure 24:
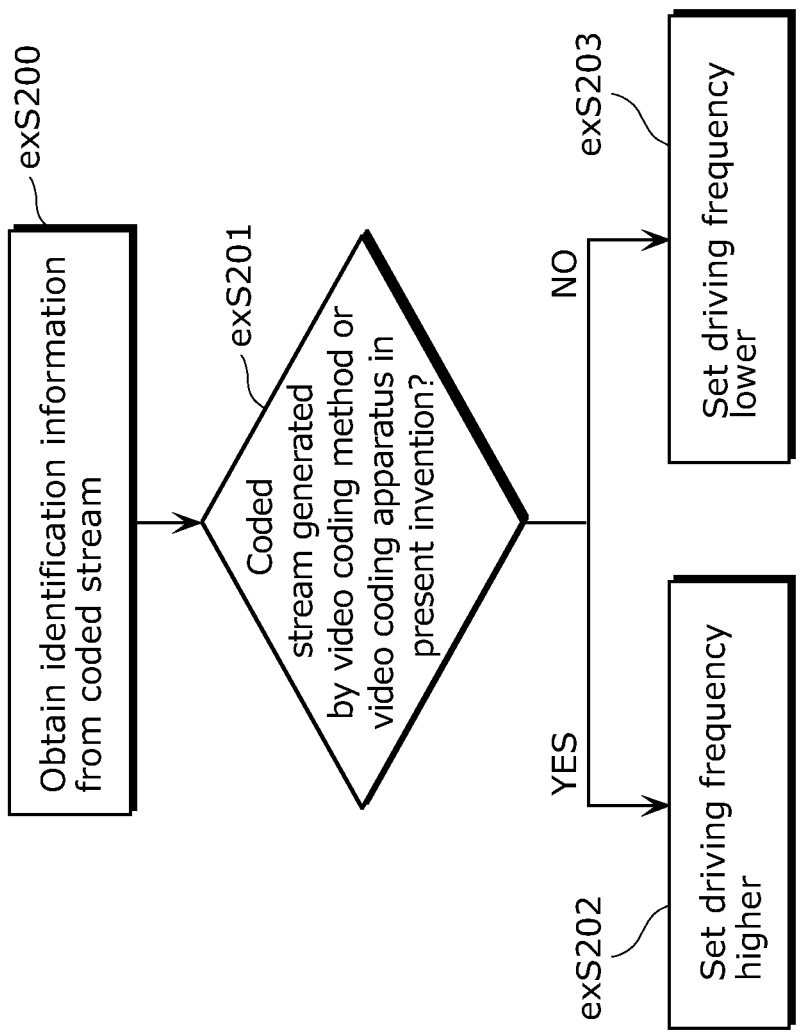
FIG. 24 illustrates steps for identifying video data and switching between driving frequencies.

FIG. 24 illustrates steps for executing a method in Embodiment 5. First, in Step exS200, the signal processing unit ex507 obtains identification information from the multiplexed data. Next, in Step exS201, the CPU ex502 determines whether or not the video data is generated based on the identification information by the coding method and the coding apparatus described in each of Embodiments. When the video data is generated by the coding method and the coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the coding method and the coding apparatus described in each of Embodiments.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the computing amount for decoding is larger, the driving frequency may be set higher, and when the computing amount for decoding is smaller, the driving frequency may be set lower as the method for setting the driving frequency. Thus, the setting method is not limited to the ones described above. For example, when the computing amount for decoding video data in conformity with MPEG4-AVC is larger than the computing amount for decoding video data generated by the video coding method and the video coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the video coding method and the video coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the video coding method and the video coding apparatus described in each of Embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the video coding method and the video coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 6

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the video decoding method described in each of Embodiments and the decoding processing unit that conforms to the conventional standard, such as MPEG-2, MPEG4-AVC, and VC-1 are partly shared. Ex900 in FIG. 26A shows an example of the configuration. For example, the video decoding method described in each of Embodiments and the video decoding method that conforms to MPEG4-AVC have, partly in common, the details of processing, such as entropy coding, inverse quantization, deblocking filtering, and motion compensated prediction. The details of processing to be shared probably include use of a decoding processing unit ex902 that conforms to MPEG4-AVC. In contrast, a dedicated decoding processing unit ex901 is probably used for other processing unique to the present invention. The decoding processing unit for implementing the video decoding method described in each of Embodiments may be shared for the processing to be shared, and a dedicated decoding processing unit may be used for processing unique to that of MPEG4-AVC.

Furthermore, ex1000 in FIG. 26B shows another example in which processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the video decoding method in the present invention and the conventional video decoding method. Here, the dedicated decoding processing units ex1001 and ex1002 are not necessarily specialized for the processing of the present invention and the processing of the conventional standard, and may be the ones capable of implementing general processing. Furthermore, the configuration of Embodiment 6 can be implemented by the LSI ex500.

As such, reducing the scale of the circuit of an LSI and reducing the cost are possible by sharing the decoding processing unit for the processing to be shared between the video decoding method in the present invention and the video decoding method in conformity with the conventional standard.

The spatial prediction method according to the present invention can reduce the complexity of the spatial prediction, and is applicable to cellular phones, personal computers, recording reproducing apparatuses, or others each of which includes, for example, at least one of (i) an image coding apparatus that codes an image using a result of the spatial prediction, (ii) an image decoding apparatus that decodes an image using a result of the spatial prediction, and (iii) the image coding apparatus and the image decoding apparatus.

LIST OF REFERENCE SIGNS

100 Image coding apparatus (encoder)
105 Subtracting unit
110 Transform quantization unit
120 Inverse quantization and inverse transform unit
125 Adding unit 130 Deblocking filter
140 Memory
150 Interpolation filter
160 Motion compensated prediction unit
165 Motion estimation unit
170 Intra prediction unit
175 Intra/inter switch unit
180 Post filter design unit
190 Entropy coding unit
200 Image decoding apparatus (decoder)
220 Inverse quantization and inverse transform unit
225 Adding unit
230 Deblocking filter
240 Memory
250 Interpolation filter
260 Motion compensated prediction unit
270 Intra prediction unit
275 Intra/inter switch unit
280 Post filter
290 Entropy decoding unit

The invention claimed is:

1. A method for decoding an image coded in intra prediction for predicting a pixel value at each pixel position within a current block included in an image, the method comprising:
   deriving, using a processor, an integer slope indicating an integer value of a slope indicated by a mode number;
   determining a sub-pel position that is an intersection between (i) a line of the integer slope that passes through the pixel position within the current block and (ii) a boundary of a block adjacent to the current block;
   predicting, for each of the pixel positions, the pixel value at the pixel position based on a pixel value interpolated in the sub-pel position determined for the pixel position to generate a predicted block;
   obtaining a residual block; and
   adding the predicted block to the residual block.

2. An image decoding apparatus that decodes an image coded in intra prediction for predicting a pixel value at each pixel position within a current block included in an image, the apparatus comprising:
   a deriving unit configured to derive an integer slope indicating an integer value of a slope indicated by a mode number;
   a determining unit configured to determine a sub-pel position that is an intersection between (i) a line of the integer slope that passes through the pixel position within the current block and (ii) a boundary of a block adjacent to the current block;
   a prediction unit configured to predict, for each of the pixel positions, the pixel value at the pixel position based on a pixel value interpolated in the sub-pel position determined for the pixel position to generate a predicted block;
   an obtaining unit configured to obtain a residual block; and
   an adding unit configured to add the predicted block to the residual block.

3. An image decoding apparatus that decodes an image coded in intra prediction for predicting a pixel value at each pixel position within a current block included in an image, the apparatus comprising:
   a processor; and
   a non-transitory memory having executable instructions stored thereon, which when executed by the processor cause the processor to perform the following:
   deriving an integer slope indicating an integer value of a slope indicated by a mode number;
   determining a sub-pel position that is an intersection between (i) a line of the integer slope that passes through the pixel position within the current block and (ii) a boundary of a block adjacent to the current block;
   predicting, for each of the pixel positions, the pixel value at the pixel position based on a pixel value interpolated in the sub-pel position determined for the pixel position to generate a predicted block;
   obtaining a residual block; and
   adding the predicted block to the residual block.

* * * * *